(12) United States Patent
Howard et al.

(10) Patent No.: US 9,911,377 B2
(45) Date of Patent: Mar. 6, 2018

(54) DYNAMIC MERCHANDISING COMMUNICATION SYSTEM

(71) Applicant: CLOVERLEAF MEDIA LLC, San Diego, CA (US)

(72) Inventors: Kevin Brent Howard, Laguna Niguel, CA (US); Gordon Davidson, Irvine, CA (US)

(73) Assignee: Cloverleaf Media, LLC

( * ) Notice: Subject to any disclaimer, the term of this patent is extended or adjusted under 35 U.S.C. 154(b) by 0 days.

(21) Appl. No.: 15/139,082

(22) Filed: Apr. 26, 2016

(65) Prior Publication Data

US 2016/0240131 A1 Aug. 18, 2016

Related U.S. Application Data

(63) Continuation of application No. 14/815,784, filed on Jul. 31, 2015.

(Continued)

(51) Int. Cl.

| | |
|---|---|
| *G09G 3/32* | (2016.01) |
| *G06F 3/14* | (2006.01) |
| *G06F 3/00* | (2006.01) |
| *G06Q 30/02* | (2012.01) |
| *G06K 9/00* | (2006.01) |
| *G06K 9/20* | (2006.01) |

(Continued)

(52) U.S. Cl.
CPC ............ *G09G 3/32* (2013.01); *G06F 3/005* (2013.01); *G06F 3/147* (2013.01); *G06F 3/1423* (2013.01); *G06F 3/1446* (2013.01); *G06K 9/00228* (2013.01); *G06K 9/00342* (2013.01); *G06K 9/00671* (2013.01); *G06K 9/00771* (2013.01); *G06K 9/209* (2013.01); *G06K 9/78* (2013.01); *G06Q 30/0241* (2013.01); *G06Q 30/0257* (2013.01); *G06Q 30/0601* (2013.01); *H04N 7/181* (2013.01); *G09G 2300/026* (2013.01); *G09G 2340/02* (2013.01); *G09G 2354/00* (2013.01); *G09G 2380/04* (2013.01)

(58) Field of Classification Search
CPC ..... G09G 3/32; G06F 3/1423; G06F 9/00228; G06F 9/00342; G06F 9/78; G06Q 30/0241; E04F 13/08
See application file for complete search history.

(56) References Cited

U.S. PATENT DOCUMENTS

| | | |
|---|---|---|
| D259,408 S | 6/1981 | Wright et al. |
| D346,759 S | 5/1994 | Job et al. |

(Continued)

FOREIGN PATENT DOCUMENTS

WO WO 2016/019352 2/2016

OTHER PUBLICATIONS

International Search Report and Written Opinion for International Application No. PCT/US2015/043316, dated Jan. 22, 2016, 14 pages.

(Continued)

*Primary Examiner* — Kevin M Nguyen
(74) *Attorney, Agent, or Firm* — Cooley LLP

(57) ABSTRACT

Provided herein are display systems and units, including those configured for dynamic communication in a physical location, such as in retail settings. Also included herein are methods for dynamically displaying product information in a physical location, such as a retail setting.

22 Claims, 14 Drawing Sheets

Related U.S. Application Data

(60) Provisional application No. 62/031,258, filed on Jul. 31, 2014, provisional application No. 62/190,580, filed on Jul. 9, 2015.

(51) Int. Cl.
  *G06K 9/78* (2006.01)
  *G06Q 30/06* (2012.01)
  *H04N 7/18* (2006.01)
  *G06F 3/147* (2006.01)

(56) References Cited

U.S. PATENT DOCUMENTS

| | | |
|---|---|---|
| D375,908 S | 11/1996 | Schumaker et al. |
| D378,065 S | 2/1997 | Levy |
| D424,068 S | 5/2000 | Takemasa |
| D424,538 S | 5/2000 | Hayashi et al. |
| D487,889 S | 3/2004 | Baker |
| D519,117 S | 4/2006 | Lewis |
| D534,214 S | 12/2006 | Marcy et al. |
| D545,693 S | 7/2007 | Iwasaki |
| D564,990 S | 3/2008 | Ueno |
| D600,661 S | 9/2009 | Ohki et al. |
| D607,854 S | 1/2010 | Sagawa |
| D611,918 S | 3/2010 | Shih et al. |
| D618,189 S | 6/2010 | Honda |
| D637,651 S | 5/2011 | Hase et al. |
| D669,076 S | 10/2012 | Haller |
| D672,817 S | 12/2012 | Butmir et al. |
| D681,740 S | 5/2013 | Hase et al. |
| D693,343 S | 11/2013 | Haller |
| D714,389 S | 9/2014 | Lee et al. |
| D739,402 S | 9/2015 | Seoc |
| D763,965 S | 8/2016 | Mukaide |
| 9,576,174 B1 | 2/2017 | Howard et al. |
| D791,617 S | 7/2017 | Howard et al. |
| 2002/0167500 A1 | 11/2002 | Gelbman |
| 2003/0037473 A1 | 2/2003 | Pifer |
| 2004/0160199 A1* | 8/2004 | Morgan .............. A01M 1/04 315/312 |
| 2004/0178308 A1 | 9/2004 | Bacnik |
| 2004/0244244 A1 | 12/2004 | Klassen et al. |
| 2005/0103853 A1 | 5/2005 | Stephenson et al. |
| 2005/0104806 A1 | 5/2005 | Stephenson |
| 2005/0128222 A1 | 6/2005 | Huang |
| 2005/0134549 A1 | 6/2005 | Kamiya et al. |
| 2005/0218218 A1 | 10/2005 | Koster |
| 2006/0232495 A1 | 10/2006 | Chang et al. |
| 2006/0273162 A1 | 12/2006 | Andersson et al. |
| 2007/0109262 A1 | 5/2007 | Oshima et al. |
| 2009/0174996 A1 | 7/2009 | Park |
| 2010/0012600 A1 | 1/2010 | Clontz et al. |
| 2010/0275267 A1 | 10/2010 | Walker et al. |
| 2010/0287057 A1 | 11/2010 | Aihara et al. |
| 2011/0006114 A1 | 1/2011 | Schueller et al. |
| 2011/0173082 A1 | 7/2011 | Breitenbach et al. |
| 2011/0181495 A1 | 7/2011 | Chu et al. |
| 2011/0231285 A1 | 9/2011 | Englund et al. |
| 2011/0286195 A1 | 11/2011 | Horikiri et al. |
| 2012/0023797 A1 | 2/2012 | Rosander et al. |
| 2012/0120327 A1 | 5/2012 | Marx et al. |
| 2012/0120471 A1 | 5/2012 | Hamalainen et al. |
| 2012/0191577 A1 | 7/2012 | Gonsalves et al. |
| 2012/0223875 A1* | 9/2012 | Lau .................. H01L 27/156 345/83 |
| 2012/0261711 A1* | 10/2012 | Brown .................. H01L 33/62 257/99 |
| 2013/0117153 A1 | 5/2013 | Shen |
| 2013/0186962 A1 | 7/2013 | Kennett et al. |
| 2013/0226742 A1* | 8/2013 | Johnson .............. G06Q 30/02 705/27.1 |
| 2013/0241431 A1 | 9/2013 | Toyotaka et al. |
| 2013/0332553 A1 | 12/2013 | Hung et al. |
| 2013/0335353 A1 | 12/2013 | Segal et al. |
| 2014/0139548 A1 | 5/2014 | Byers |
| 2015/0039477 A1 | 2/2015 | O'Neil |
| 2015/0042540 A1 | 2/2015 | Goel |
| 2015/0140668 A1 | 5/2015 | Mellars et al. |
| 2015/0186097 A1 | 7/2015 | Hall |
| 2015/0262230 A1* | 9/2015 | Cypher ............. G06Q 30/0251 705/14.49 |
| 2016/0034244 A1 | 2/2016 | Howard et al. |
| 2016/0034959 A1 | 2/2016 | Howard et al. |
| 2016/0034960 A1 | 2/2016 | Howard et al. |
| 2016/0034988 A1 | 2/2016 | Howard et al. |
| 2016/0065649 A1 | 3/2016 | Ou |
| 2016/0078796 A1 | 3/2016 | Cho et al. |
| 2016/0132822 A1 | 5/2016 | Swafford |
| 2016/0260163 A1 | 9/2016 | Sjodin |
| 2017/0009971 A1 | 1/2017 | Chan et al. |
| 2017/0105300 A1 | 4/2017 | Howard et al. |

OTHER PUBLICATIONS

Office Action for U.S. Appl. No. 15/140,416, dated Aug. 18, 2016, 23 pages.
U.S. Appl. No. 61/952,420, filed Mar. 13, 2014, Cypher et al.
Office Action for U.S. Appl. No. 14/815,784, dated Nov. 3, 2016, 34 pages.
Office Action for U.S. Appl. No. 14/815,784, dated Apr. 20, 2017, 16 pages.
Office Action for U.S. Appl. No. 15/140,374, dated Sep. 28, 2016, 29 pages.
Office Action for U.S. Appl. No. 15/140,374, dated Feb. 16, 2017, 32 pages.
International Search Report and Written Opinion for International Application No. PCT/US2016/056461, dated Dec. 2, 2016, 17 pages.
International Search Report and Written Opinion for International Application No. PCT/US2016/056455, dated Dec. 9, 2016, 17 pages.
Office Action for U.S. Appl. No. 15/436,645, dated Jun. 1, 2017, 24 pages.

* cited by examiner

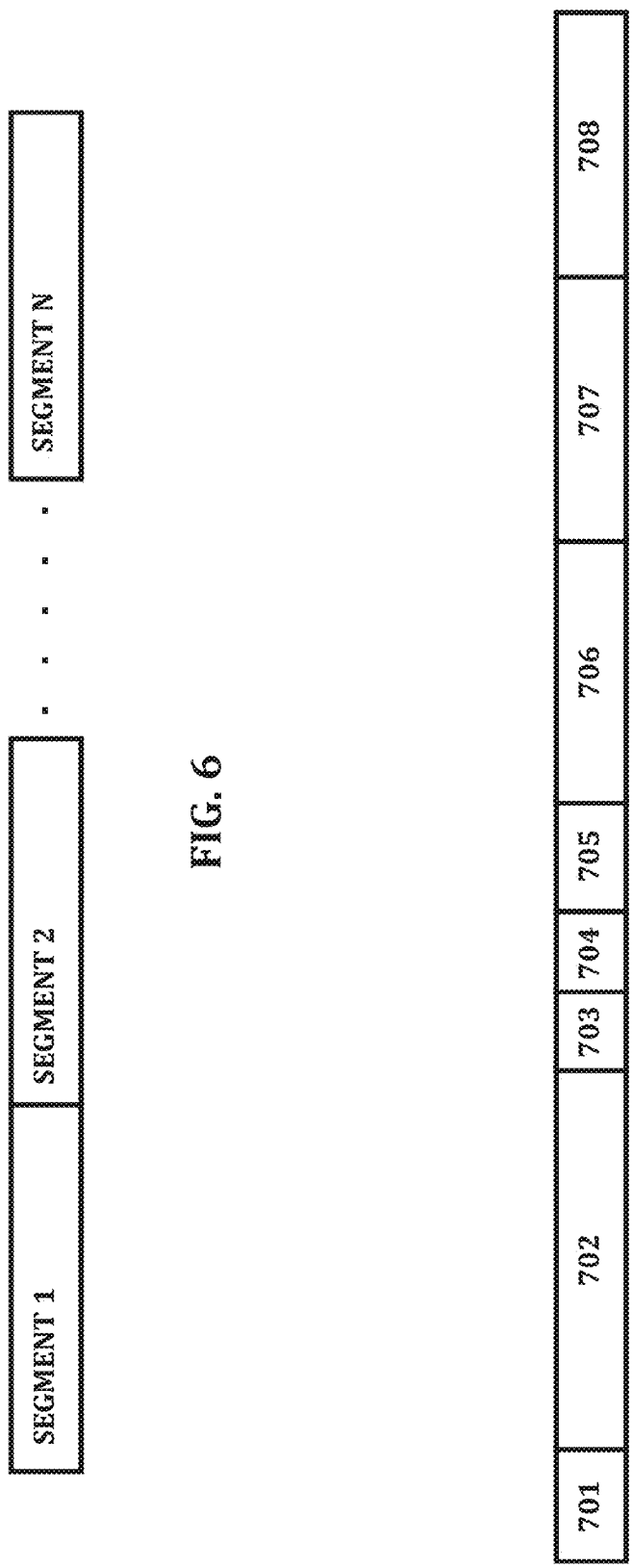

DYNAMIC MERCHANDISING COMMUNICATION SYSTEM

CROSS-REFERENCE

This application is a continuation of U.S. application Ser. No. 14/815,784, filed Jul. 31, 2015, entitled DYNAMIC MERCHANDISING COMMUNICATION SYSTEM, which claims the benefit of U.S. Provisional Application Nos. 62/031,258, filed 31 Jul. 2014, and 62/190,580, filed 9 Jul. 2015, all of which are incorporated herein in their entireties. The present application is related to U.S. application Ser. No. 15/140,416, entitled SYSTEMS AND METHODS FOR SERVING PIXEL MAPPED CONTENT TO MERCHANDISING COMMUNICATION SYSTEMS, filed Apr. 27, 2016, and to U.S. application Ser. No. 15/140,374, entitled LED RETAIL DIGITAL SIGNAGE, filed Apr. 27, 2016, the contents of which are hereby incorporated by reference in their entirety for all purposes.

FIELD

The disclosure relates to devices, systems and methods for displaying content on and serving content to merchandising communication systems.

BACKGROUND OF THE INVENTION

There are a variety of retail options for displaying a variety of information in retail environments, including, pricing, labeling, promotions, etc. Traditionally, this information has been provided using print systems, including slide-in paper system, plastic label systems, adhesive label systems, etc. More recently, there has been increased interest in utilizing digital or electronic systems to display such information.

The utilization of high definition display technology, including plasma displays, LCD displays (including those backlit by light emitting diodes (LEDs)), etc., in such applications was considered, but such systems are expensive, limiting their scope of commercial adoption. For example, many retail outlets have large numbers of shelves that require the display of information. Systems described in US 2014/0139548 utilize only a single display strip per aisle for displaying the prices of products on a multiple shelves. This approach may alleviate some of the cost-prohibitive nature of such devices, but leaves a great deal to be desired as the prices are no longer located adjacent the product, resulting in frustrated customers having to search for prices. In addition, such systems utilize displays that are not only expensive to install, but to replace. US 2010/0012600 suggests the use of such displays protrude into the aisles where customers can knock the displays off and/or otherwise damage the displays. The solution there was to provide a large housing below the shelf to secure the electronics and protect them from being damaged. However, these large systems are even more difficult and expensive to transport and install, and do not provide optimal display surface areas.

The utilization of less complex and cheaper displays have also been considered, including e-paper displays (EPD), and thin-film-transistor liquid crystal displays (TFT LCD). However, such solutions are not one continuous strip. Therefore, a retailer cannot manage and communicate with an entire shelf display or multiple shelf displays in a single action. Instead, such digital and print displays, while possibly being adequate for displaying pricing information, product information, etc., they must be managed individually and do not have the ability to display complete aisle cross-branding, customer communication, display true or full-spectrum color, or full motion video and/or animation. Typical TFT displays for such applications are limited to displays that are 480 pixels wide by 272 pixels high, limiting the viability of such solutions. With graphics cards having a 2048 pixel wide by 1152 pixel high capability, such displays would need to be linked together with multiple displays and multiple graphics cards, requiring sophisticated and expensive synchronization software. Further, such systems would be limited to a maximum of twelve displays, equivalent to a five-foot section of tethered displays, through a single display server. In addition, such displays have relatively poor brightness—e.g., generally only up to about 25 NITS—and angle and distance legibility parameters—e.g., generally up to a maximum of about 2-3 feet at a 90 degree viewing angle and about 1-2 feet at a 25 degree viewing angle.

SUMMARY OF THE INVENTION

Provided herein are displays, components thereof, and systems thereof. In specific embodiments, such displays, components and systems are used or useful in retail applications. In some embodiments, such displays are cost effective, while having a low profile, being impact resistant, having continuous display capabilities, having full color capabilities, having excellent brightness parameters, and/or having excellent visibility parameters, as well as other advantageous features. Further, by including sensor capabilities, systems and display units provided herein are able to provide dynamic merchandising and experiences, as well reduce labor and capital investment costs associated with inventorying, controlling product environments (e.g., to reduce product spoilage and waste), and the like.

Provided in certain embodiments herein is a light emitting diode display system comprising at least one light emitting diode display. In specific embodiments, the light emitting diode display comprises a viewable surface comprising light emitting diode pixels. Generally, it is to be understood that such displays are not to be confused with liquid crystalline displays (LCDs) that are backlit with light emitting diodes (LEDs), but are often referred to in the art as LED displays. Thus, in certain embodiments, LED displays provided herein are non-LCD LED displays, or displays that do not comprise an LCD viewable surface. In some embodiments, a system provided herein further comprises a sensor, e.g., the sensor comprising an output configured to convey or to be connected to convey an output signal (e.g., to a controller, or a sensor control unit thereof, of the system).

Provided in certain embodiments herein is a display unit, such as a high aspect ratio display strip. In specific embodiments, such display units are configured for use in a retail environment, such as being configured to be affixed to or integrated with a retail shelving system. In other embodiments, high aspect ratio display strips provided herein are optionally configured to be utilized in other applications, including being configured to be affixed to or integrated with non-retail shelving systems.

In some embodiments, provided herein is an LED display unit (e.g., LED display strip). Generally, the LED display unit comprises an array of viewable LED pixels, and an input configured to receive (or be connected to receive) display information. In some instances, the input is configured to receive display information from a controller, e.g., directly from the controller, via another LED display unit (e.g., by daisy chaining therethrough), or the like. In some embodiments, the display information is global system display information, such as display information for multiple display units—e.g., multiple display units connected to a common controller. In some embodiments, the display unit further comprises a display component output configured to provide display information to the array of viewable LED pixels (e.g., or an LED display component body, the LED display component being the component body, such as a circuit board, of the unit comprising the array of LED pixels mounted or embedded therein/thereon). In specific embodiments, the display information provided to the LED pixel array is the display information received by the display unit, or a subset thereof. In specific embodiments, such as wherein multiple display units are controlled by a controller, the LED display unit is configured to receive global system display information and provide local display information (a subset of the global system display information) to the LED pixel array. In further embodiments, a display unit provided herein comprises one or more processor (e.g., a FPGA) configured to execute one or more program modules. An exemplary program module comprises, by way of non-limiting example, a content identification module configured to identify the local display information (e.g., identify the subset of global system display information that is to be display on the specific display unit). Additional non-limiting, exemplary display unit program modules that are optionally included in the display units provided herein are found throughout this disclosure.

In specific embodiments, provided herein is a (e.g., high aspect ratio) light emitting diode (LED) display unit (e.g., a retail display unit) comprising a receiving card and an array of LED pixels. In some embodiments, the receiving card comprises a circuit board, the circuit board comprising an input and an output (e.g., mounted thereon). In specific embodiments, the first input of the receiving card is configured to receive or to be connected to receive display information (e.g., global display information, a subset thereof to be locally displayed on the display unit). In certain embodiments, the array of LED pixels is in the form of a circuit board comprising the array of LED pixels mounted thereon or embedded therein. In further embodiments, the circuit board comprising the LED array further comprises one or more (e.g., multiple) LED drivers. In some embodiments, the output of the receiving card is configured to convey display information (e.g., local display information, such as a subset of the global display information received at the receiving card) to the LED array (e.g., circuit board comprising the same). In further or additional embodiments, the unit further comprises a second array of LED pixels and the receiving card further comprising a second output (e.g., mounted thereon), the second output of the receiving card being configured to convey display information (e.g., local display information, such as a subset of the global display information received at the receiving card) to the second LED array (e.g., circuit board comprising the same). In further or additional embodiments, the display unit further comprises a sensor (e.g., a forward facing camera, such as a camera configured to face in a direction that is within 90 degrees (or within 60 degrees or within 45 degrees or within 30 degrees, or within 15 degrees) of parallel to the direction in which the viewable display surface is configured to face). In specific embodiments, the sensor comprises an output configured to convey or to be connected to convey an output signal (e.g., to a controller or a sensor control unit thereof). In further or additional embodiments, the display unit further comprises a housing defined with one or more opening. In specific embodiments, the housing is defined with one or more opening by which the LED array(s) are exposed (e.g., externally exposed, such as to be viewable external to the display unit). In specific embodiments, a single opening exposes all LED arrays of the display unit. In some embodiments, the housing further defines a camera opening (e.g., on the same surface as the LED opening(s)) through which a camera is exposed (e.g., externally exposed, such as to allow the camera to detect and/or identify objects, persons (e.g., configured to detect facial features—i.e., facial recognition), or motion in front of the display unit, or the LED arrays thereof). Specific optional details of the display unit are described throughout this disclosure. In specific embodiments, however, the arrays have a pixel pitch of about 2.5 mm or less (e.g., about 2 mm or less, or about 1.8 mm to about 1.9 mm, or about 1.875 mm). In further or additional specific embodiments, the display unit having an aspect ratio (length/height) of about 2 or more (e.g., about 2.5 or more, or about 3 or more).

Any suitable length and height are optionally utilized, such as a height of about 30 mm to about 250 mm and a length of about 100 mm to about 2000 mm. In certain retail applications, a height suitable for display in the front of a shelf is preferred. Most preferably, the height is not so large as to block merchandise from being viewed and is not so large as to be easily bumped when removing merchandise from a shelf. In specific embodiments, the display height is about 50 mm to about 150 mm. In more preferred embodiments, the height is about 50 mm to about 105 mm. In specific embodiments, the height is about 60 mm to about 70 mm, e.g., about 65 mm. Further, in certain applications, a length suitable for display in the front of a shelf is also preferred. Longer shelves are desirable in some instances so as to minimize the number of units required. However, shorter units are desirable in some instances for versatility in more shelving configurations, to minimize replacement costs when a display is broken, or otherwise malfunctions or ceases all or some operational capabilities, etc. In some preferred embodiments, the display length is about 150 mm to about 1500 mm. In more preferred embodiments, the display length is about 200 mm to about 500 mm. In still more preferred embodiments, the display length is about 275 mm to about 350 mm. In other retail applications (e.g., hardware stores with long continuous shelving configurations), longer strips are preferred in some instances. In some embodiments, display strips provided herein have lengths of about 1 m to about 1.5 m, e.g., about 1.2 m to about 1.25 m. In some embodiments, the high aspect ratio LED strip has an aspect ratio (i.e., length/height) of at least 2.5. In more specific embodiments, the aspect ratio is at least 3. In still more specific embodiments, the aspect ratio is at least 4.

Any suitable depth of display unit (e.g., strip) is optionally utilized. In preferred embodiments, the depth of the display strip is small enough to limit its protrusion into an aisle and to reduce risk of aisle traffic bumping into the strip and potentially damaging it. The LED displays and systems provided herein allow for low profile (i.e., low depth) displays to be provided, without losing their cost effectiveness. In some embodiments, the depth of the display is less than 50 mm, e.g., less than 30 mm. In still more preferred embodiments, the depth of the display is less than 25 mm. In yet more preferred embodiments, the depth of the display is less than 20 mm. In certain instances, displays have a preferred depth of about 10 mm to about 25 mm, e.g., about 15 mm to about 20 mm.

In some embodiments, provided herein are LED displays (e.g., a component of a display unit or strip described herein) comprising an array of viewable LED pixels. In further embodiments, provided herein are systems and display units or strips comprising one or more such LED display (also referred to herein as an LED display component). In specific embodiments, the LED pixel comprises a red light emitting diode, a green light emitting diode, or a blue light emitting diode. In more specific embodiments, the LED pixel comprises a red light emitting diode, a green light emitting diode, and a blue light emitting diode. In certain embodiments, the light emitting diode is a light emitting diode chip. In specific embodiments, the LED display component comprising a conductive substrate (e.g., a printed circuit board (PCB) (e.g., a metal core printed circuit board (MCPCB))) comprising multiple light emitting diode chips mounted on or embedded in a substrate (e.g., using chip on board technologies). The chip is optionally mounted to the substrate using any suitable technique, such as by affixing the chip with an electrically conductive adhesive (e.g., an epoxy, an acrylic, a cyanoacrylate, a silicone, a urethane acrylate, or the like comprising a conductive filler, such as silver, nickel, carbon, or the like) or using any other suitable technique, such as soldering. In some embodiments, it is possible to reduce the pixel pitch (i.e., the distance between the center of one pixel to the center of adjacent pixel(s)). In some embodiments, any suitable LED technology is optionally utilized, e.g., multiple cups chip on board (MCOB), chip on board (COB) LED, surface mounted device (SMD) LED, wired LED, or the like. In preferred embodiments, the pixel pitch of any LED display or display unit provided herein is about 3.0 mm or less. In more preferred embodiments, the pixel pitch is about 2.5 mm or less. In still more preferred embodiments, the pixel pitch is about 2.0 mm or less. In yet more preferred embodiments, the pixel pitch is about 1.9 mm or less (e.g., about 1.875 mm).

In certain embodiments, the array of viewable LED pixels has a first number of pixels in the first dimension and a second number of pixels in a second dimension. In some embodiments, the first (height) dimension comprises about 24 pixels or more. In preferred embodiments, the first (height) dimension comprises about 30 pixels or more (e.g., about 32 pixels). In more preferred embodiments, the first (height dimension comprises about 30 to about 60 pixels. Generally, about 30 or more pixels are preferred to provide minimum desired display requirements, providing for at least three lines of text with minimal visible text defect. Any suitable number of pixels is present in the second (length) direction. Pixel pitch in the second (length) dimension is preferably about the same as the pixel pitch in the dimension, the number of pixels being determined thereby and by the length of the display unit. In certain embodiments, the number of LED pixels in the second dimension is about 100 or more. In preferred embodiments, the number of LED pixels in the second dimension is about 100 to about 500, e.g., about 120 to about 200 or about 160.

In some embodiments, the legibility of displays provided herein are superior over EPD and LCD TFT type displays, while remaining cost effective and having full color capabilities. In certain embodiments, the maximum legality distance of a display provided herein at a viewing angle of 90 degrees is about 5 feet or more. In more preferred embodiments, the maximum legality distance of a display provided herein at a viewing angle of 90 degrees is about 10 feet or more. In more specific embodiments, the maximum legality distance of a display provided herein at a viewing angle of 90 degrees is about 20 feet or more. In certain embodiments, the maximum legality distance of a display provided herein at a viewing angle of 25 degrees is about 2 feet or more. In more preferred embodiments, the maximum legality distance of a display provided herein at a viewing angle of 90 degrees is about 5 feet or more. In more specific embodiments, the maximum legality distance of a display provided herein at a viewing angle of 90 degrees is about 8 feet or more.

In some embodiments, the brightness of the LED displays provided herein can be configured to to provide improved viewability and an improved viewing experience, relative to other systems, such as EPD, TFT, and similar systems. In some embodiments, the display units (e.g., LED pixel arrays thereof) provided herein are configured to have a brightness of about 500 NITS or more, such as about 800 NITS or about 1000 NITS. In certain instances, while display units described herein have high brightness capabilities (e.g., about 500 NITs or more, such as about 800 NITS or about 1000 NITS), the display is configured to run at lower brightness levels (e.g., to save energy) (e.g., about 25% to about 100% brightness capability), such as about 200 NITS or more, e.g., about 300 NITS to about 400 NITS.

In some embodiments, the viewable surface of the LED display component comprises an array of viewable LED pixels and a coating (e.g., a conformal coating in which the LED pixels or components thereof are embedded in the coating). In certain embodiments, the coating comprising any suitable material, such as an epoxy, a polyurethane, an acrylic, a silicone, or a combination thereof. In some embodiments, such coatings serve to protect the LED components from impact damage or environmental damage (e.g., from humidity, mildew, thermal variation variation, liquid spills, etc.).

In preferred embodiments, the display unit(s) (e.g., strips) comprise at least a first and a second light emitting diode (LED) display component. In certain instances, the use of a first and a second light emitting diode (LED) display component further facilitates cost effective display replacement options, such as when a display component become damaged or otherwise has less than optimal or desired functionality. In such instances, replacement of a display component is optionally effected without replacing the entire display unit or even the entire display portion of the display unit.

In certain embodiments, a display unit (e.g., strip) provided herein comprises an input configured to receive display information (e.g., display information to be displayed on the display unit and, optionally, to be displayed on one or more additional display unit(s)). In some embodiments (e.g., in a system comprising multiple display units), the input is configured to receive global system display information. Generally, global system display information comprises the display information to be displayed on one or more LED display units (and, optionally, additional display types). In some embodiments, the global system display information comprises the display information to be displayed on multiple display units. In certain embodiments, the global system display information is provided to multiple display units in any suitable manner. For example, in some embodiments, the global system display information is directly provided to the inputs of the multiple LED display units. In other embodiments, the information is provided to the multiple LED display units by daisy chaining the information through one or more of the multiple display units.

In some embodiments, a display unit (e.g., strip) provided herein further comprises an output configured to provide display information (e.g., global system display information) to an additional display (e.g., an LED display unit described herein)—such as in a daisy-chaining manner. In certain embodiments wherein the LED display unit is present in a multiple display unit system, the output is configured to provide display information (e.g., global system display information) to an input configured to receive display information of a second LED display unit.

In certain embodiments, a display unit (e.g., strip) comprises an output configured to provide local display information. In certain embodiments, local display information is specific to the display unit. In some embodiments, local display information is a subset of the global system display information. In other embodiments, local display information is specific to an LED display component. In some embodiments, the output is configured to provide local display information to an LED display component of the display unit. In specific embodiments, the display unit comprises a first output configured to provide local display information (e.g., first local display information) to a first LED display component and a second output configured to provide local display information (e.g., second local display information) to a second LED display component.

In some embodiments, the display unit comprises an identification module (e.g., hardware, software, firmware, or the like) configured to store and/or determine an identifier associated with the display unit, or of display components thereof (e.g., in certain instances wherein a display unit comprises multiple display components). In specific embodiments, the identifier is associated with the location of the display unit within a system comprising the display unit and at least one additional display (e.g., additional display units or strips of the type described herein). In certain embodiments, the identification module identifies the location of the display unit, such as the location in a system comprising multiple display units, including one or more of the LED display units described herein and, optionally, additional display unit types.

In some embodiments, the display unit(s) comprises a content identification module configured to identify the information (e.g., video, images, text, and/or the like) to be displayed at the identified location. In specific embodiments, the content identification module identifies a subset of information to be decompressed by the decompression module and displayed at the identified location. In some such embodiments, the decompression module de-compresses (e.g., only) the subset of information received that is to be displayed at the identified location.

In some embodiments, the display unit (e.g., strip) comprises a content identification module that is configured to identify the local display information (e.g., as-received or decompressed information) to be displayed on the display unit. In specific embodiments, one or more content identification module is configured to identify local display information to be displayed on a first LED display component and a second LED display component. In more specific embodiments, a single content identification module is configured to identify local display information for both a first and a second LED display component. In other specific embodiments, a first content identification module is configured to identify first local display information for (e.g., to be displayed on) a first LED display component and a second content identification module is configured to identify second local display information for (e.g., to be displayed on) a second LED display component.

In some embodiments, the display unit (e.g., strip) comprises an information decompression module that is configured to decompress compressed display information. In specific embodiments, the information decompression module is configured to decompress compressed global system display information, or a subset thereof, received by the display. In specific embodiments, the information decompression module is configured to decompress local display information (e.g., decompress information identified by the content identification module as being local display information for the identified display).

In more general embodiments, provided herein is a display system (e.g., a dynamic retail display system) comprising a sensor (e.g., camera (e.g., the system being configured to detect motion and/or faces), motion detector, infrared detector, or the like) and one or more display unit (e.g., a display unit or strip described herein). In specific instances, the system comprises a sensor configured to provide output signals to a controller, the output signals conveying information regarding the state of an operating parameter, the controller configured to identify the state of an operating parameter (e.g., identify the status of a predetermined sensor state, such as motion, no motion, and captive (e.g., as determined by identification of a face using facial recognition software)) to provide predetermined display information (content) to the one or more display unit of the system based on the identified sensor state. In more specific instances, the system comprises a first sensor associated with a first display unit and a second sensor associated with a second display unit. In other words, in some instances, the first sensor is configured to provide first output signals to a controller, the first output signals conveying information regarding the state of a first operating parameter, the controller configured to identify the state of the first operating parameter (e.g., identify the status of a predetermined sensor state, such as motion, no motion, and captive (e.g., as determined by identification of a face using facial recognition software)) and to provide first predetermined display information (content, such as images, text, video) to the first display unit of the system based on the identified first operating parameter, and the second sensor is configured to provide second output signals to the controller (or, optionally, a second controller), the second output signals conveying information regarding the state of a second operating parameter to the controller, the second output signals conveying information regarding the state of a second operating parameter, the controller configured to identify the state of the second operating parameter and to provide second predetermined display information (content, such as images, text, video) to the second display unit of the system based on the identified second operating parameter. Further, in certain embodiments, a system provided herein comprises a shelf or shelving, with one or more display unit (e.g., a display unit provided herein) affixed thereto or integrated therewith.

In certain embodiments, a system or display unit (e.g., strip) provided herein comprises a sensor configured to provide sensor output signals, the sensor output signals conveying information regarding a state of an operating parameter (e.g., of the display unit or sensor). In certain embodiments, the sensor is a motion detector, a camera (e.g., configured to detect motion and/or facial features—i.e., facial recognition), or any suitable sensor for detecting an object or person in proximity to the display, and/or detecting a state of an object or person in proximity to the display. In specific embodiments, the sensor is configured to detect a person located in front of the display and/or in front of closely adjacent displays (e.g., wherein a system comprising multiple display units is provided). In some embodiments, the sensor is configured to detect a predetermined state of a person located in front of the display and/or in front of closely adjacent displays (e.g., wherein a system comprising multiple display units is provided). In specific embodiments, provided herein is a system comprising multiple display units, at least one display unit comprising a sensor. Further, in some embodiments, the display unit, e.g., sensor thereof, comprises a module configured to store and/or determine a sensor identifier associated with (e.g., the location of) the sensor (e.g., in and/or near which display units the sensor is located). In specific instances, the sensor identifier is a dynamic identifier, such as an identifier assigned based on the order in which multiple sensors of the system are manually connected to the system.

In some embodiments, the display unit or a system comprising the display unit comprises a sensor identification module (e.g., hardware, software, firmware, or the like) configured to store and/or determine a sensor identifier associated with the sensor. In specific embodiments, the sensor identifier is associated with the location of the display unit or sensor within a system comprising the display unit and at least one additional display (e.g., additional display units or strips of the type described herein).

In some embodiments, provided herein is a system (e.g., a retail display system) comprising any display described herein and a controller. In various embodiments, the controller comprises one or more controller units that when taken together comprise the features and/or perform the functions described herein. In some embodiments, the controller comprises an output configured to provide global system display information to one or more display unit (e.g., multiple display units). In certain embodiments, the controller comprises an input configured to receive a sensor output signal (e.g., from one or more sensor of one or more display unit described herein).

In some embodiments, the system, e.g., controller thereof, comprises a sensor state identification module configured to identify or monitor a sensor state (e.g., of an operating parameter) of a sensor thereof (e.g., configured to detect sensor states and/or interactions). For example, in certain embodiments, the sensor state identification module is configured to detect whether or not a person is in proximity to a display unit of the system (e.g., the display unit in which the sensor is located, or an adjacent or otherwise nearby display unit) (e.g., wherein the sensor state operating parameter is near or not near one or more display unit of a system described herein). In some embodiments, a system provided herein further comprises a sensor state information module configured to identify predetermined information to be provided to (or displayed on) a display unit based on whether or not a predetermined sensor state (e.g., of an operating parameter) of a sensor has been satisfied.

In specific embodiments, provided herein is a display system (e.g., a retail display system, such as a retail shelving display system) comprising a controller and a first and a second high aspect ratio display light emitting diode (LED) display strips. In more specific embodiments, the first LED display strip comprises a first LED display component comprising a first array of viewable LED pixels; a first input configured to receive global system display information; a first output configured to provide first local display information to the first LED display component, the local display information of the first LED display strip being a subset of the global system display information; and one or more first processors (e.g., FPGA) configured to execute first LED display strip program module, e.g., the first LED display strip program modules comprising a content identification module configured to identify the first local display information of the first LED display strip. In some specific embodiments, the second LED display strip comprises a second LED display component comprising an array of viewable LED pixels; a second input configured to receive global system display information; a second output configured to provide local display information of the second LED display component, the local display information of the first LED display strip being a subset of the global system display information; and one or more second processors (e.g., FPGA) configured to execute second LED display strip program modules, the second LED display strip program modules comprising a second content identification module configured to identify the second local display information of the second LED display strip. In further specific embodiments, at least one of the first or second LED display strip comprises a sensor (e.g., a motion detector, camera, or the like) configured to provide a sensor output signal to the controller, the sensor output signals conveying information regarding a state of one or more operating parameter (i.e., a "sensor state" described herein). In specific embodiments, the controller comprises a third input configured to receive the sensor output signal; a third output configured to transmit the global system display information; and one or more processors configured to execute one or more controller program module, e.g., the controller program module(s) comprising a module configured to determine the state of the operating parameter based on the information regarding the state of the operating parameter in the sensor output signal; and one or more module configured to identify first predetermined local display information to be provided to the first LED display unit and second predetermined local display information to be provided to the second LED display unit based on the status of the one or more operating parameter (i.e., sensor state).

In some embodiments, the system, e.g., controller thereof, comprises a display information retrieval module configured to retrieve display information (e.g., global display information) based on one or more sensor state identified. In specific instances, based on all system sensor states identified, the module is configured to retrieve a complete pre-stitched set of display information (e.g., global display information) (e.g., based on the sensor state of multiple, such as all, system sensors). In other embodiments, the system, e.g., controller thereof, comprises a stitching module configured to stitch information (e.g., into a complete system display information set, or the global system display information) to be provided to the multiple display units of the system (e.g., such information for the display units of the system being identified by one or more sensor state information module). In certain embodiments, the information identified is local display information that is stitched together into global system display information by one or more controller module and the collection of local display information being, ultimately, identified at and display on the respective display units.

Further, in certain embodiments, the system (e.g., controller thereof) comprises a sensor identification module configured to identify an identifier associated the sensor from which a sensor output signal is received (e.g., the location of the sensor in the system). In some embodiments, the sensor state information module (e.g., itself comprising one or more module) is configured to identify predetermined information to be provided to (or displayed on) a display unit based on (i) whether or not a predetermined sensor state (e.g., of an operating parameter of a sensor has been satisfied), and (ii) the identifier associated with the sensor (e.g., related to location of the sensor, such as in relation to the display—e.g., the sensor being in the display or near the display).

In some embodiments, the system (e.g., controller thereof) comprises a compression module configured to compress the global system display information, e.g., prior to providing it to the output and, ultimately, the display unit(s) of the system. In certain embodiments, the system (e.g., one or more display unit thereof) comprises a decompression module configured to de-compress all or part of the global system display information. In specific embodiments, one or more of the display units of a system provided herein comprise a decompression module configured to de-compress information identified by a content identification module of the display unit as local display information. Any suitable compression and decompression techniques are optionally utilized.

In certain embodiments, modules described herein are program modules, one or more processors configured to execute such program modules. In various embodiments, processors provided herein are units capable of executing and/or configured to execute program modules and include, by way of non-limiting example, computer processing units (CPUs), graphics processing units (GPUs), field-programmable gate arrays (FPGAs), and combinations thereof. In other embodiments, modules are, optionally, hardware modules, firmware modules, or other suitable modules. In various embodiments, modules comprise a combination of program and hardware modules.

BRIEF DESCRIPTION OF THE DRAWINGS

FIG. 6 illustrates an exemplary logical layout on one or more shelf face using a segmented graphics card configuration.

FIG. 7 illustrates an exemplary segmented content configuration of an exemplary system provided herein.

DETAILED DESCRIPTION OF THE INVENTION

In certain embodiments, the light emitting diode displays provided herein is a high aspect ratio light emitting diode display strip, systems comprising the same and components thereof. In specific embodiments, the display strips are useful for and/or configured for retail applications, such as to be integrated with or attached to a scaffold, such as a retail scaffold, e.g., (e.g., the front surface of) a shelf. In specific applications, the shelf is a retail shelf.

Figure 1:
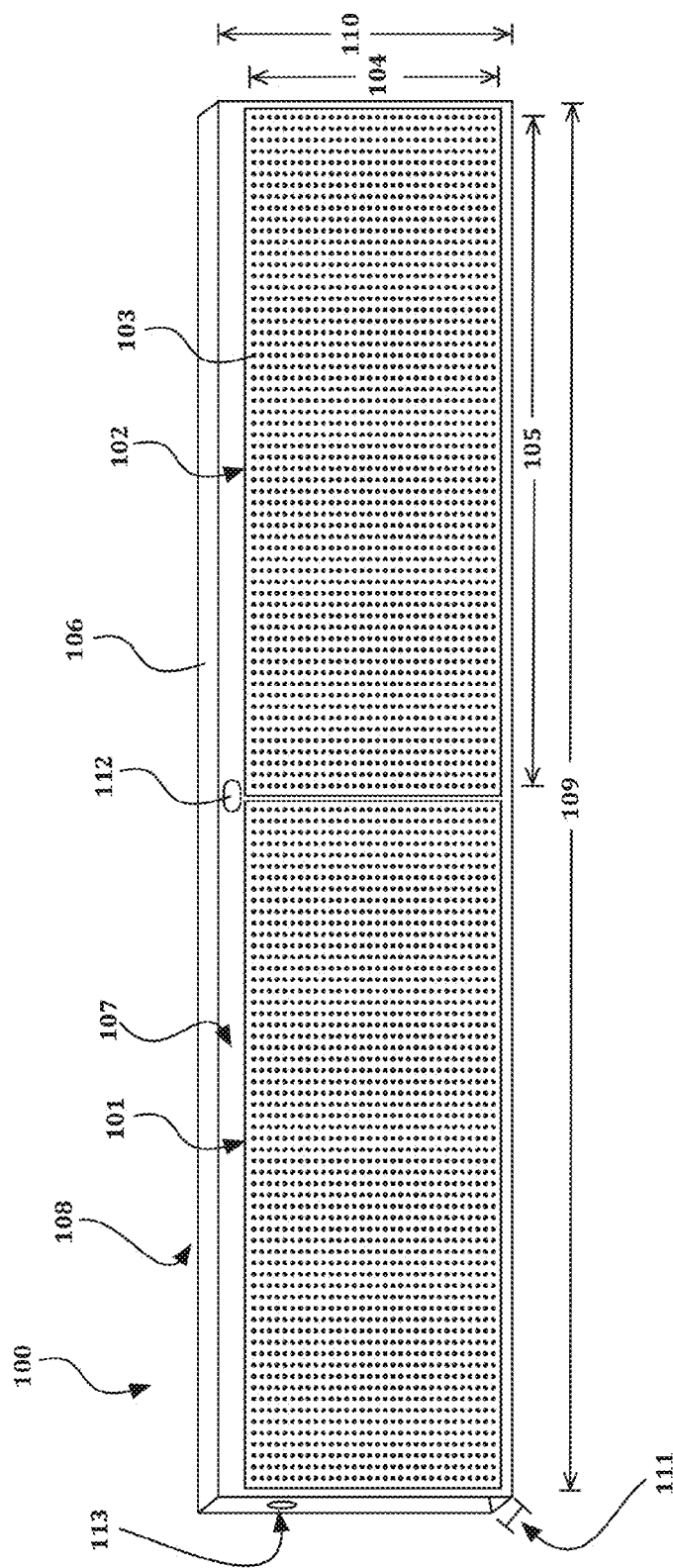
FIG. 1 illustrates a front perspective view of an exemplary high aspect ratio LED display unit comprising an array of viewable LED pixels.
Figure 14:
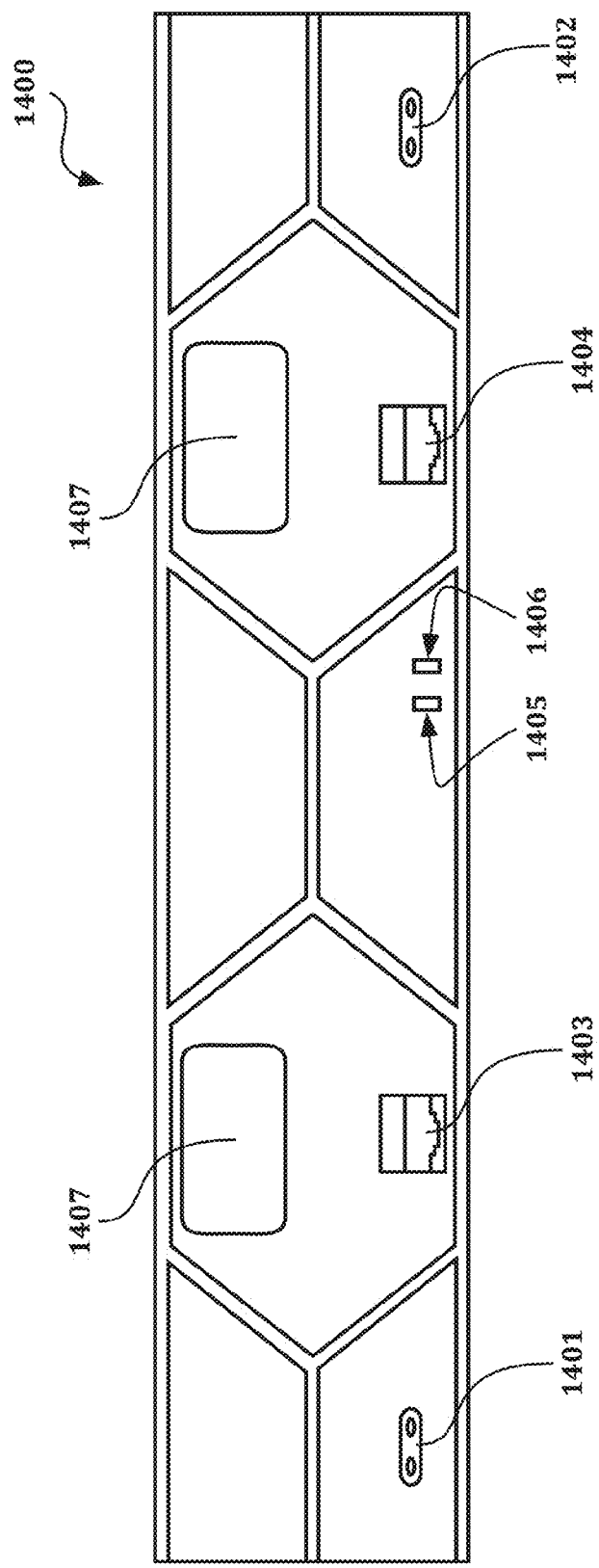
FIG. 14 illustrates the rear surface of an exemplary display unit provided herein.

FIG. 1 illustrates an exemplary high aspect ratio LED display unit 100 provided herein. The exemplary display unit comprises a first LED display component 101 and a second LED display component 102. Each exemplary display unit comprises an array of LED pixels 103, the array comprising 32 LED pixels in a first dimension 104 and 80 LED pixels in a second dimension 105, the display unit as a whole comprising an array of 160 LED pixels by 32 LED pixels. In addition, the exemplary display unit comprises a housing body 106, comprising a front surface 107 and rear surface 108 and having a length 109, a height 110, and a depth 111. The front and rear surfaces are optionally flat or contoured, depending on the specific application. The exemplary display unit further comprises a forward facing (e.g., positioned to face outward from the front surface of the) sensor (e.g., motion detector or camera) 112 situated in an approximately central position along the length of the display unit. In some embodiments, the sensor (e.g., camera) is located in a forward facing position on an upper portion of the display unit (e.g., as displayed in FIG. 1), on a lower portion of the display unit (e.g., if the display unit of FIG. 1 were flipped over), or any other suitable position. In exemplary embodiments, the display unit 100 comprises one or more chaining (e.g., daisy-chaining) connectors 113, e.g., configured to receive and/or convey, provide or transmit display information (e.g., to additional display units—not illustrated). FIG. 14 illustrates the rear surface of an exemplary display unit 1400 provided herein. In some instances, the display unit comprises a power input 1401 and a power output 1402 (e.g., a simple two pin power connector, such as Molex), e.g., configured to daisy chain power to one or more additional display unit. In certain instances, the display unit comprises a display information input 1403 and a display information output, e.g., configured to daisy chain data to one or more additional display unit. In some instances, the display unit further comprises one or more data input and/or output 1404 and 1405 (e.g., a USB type output, such as USB 3.0, USB 2.0, mini USB, micro USB, or the like), such as a sensor information output and/or a sensor information input (e.g., configured to receive and/or convey sensor information from one or more sensor).

In some embodiments, provided herein is a display unit comprising a power supply (e.g., a DC/DC converter or an AC/DC converter). In certain embodiments, a display unit provided herein is configured to receive power and display information via a single source, such as over Ethernet. In other embodiments, a display unit provided herein is configured to receive power and display information via different sources. In some embodiments, display units provided herein further comprise power regulators, e.g., to ensure a stable voltage provided to the display unit components. In some embodiments, display units provided herein additionally comprise one or more LED driver, e.g., configured to control the current provided to the LED array, which in some instances reduces the risk of LED failure.

Display units provided herein are configured to receive display information from wired and/or wireless sources. In certain embodiments, the display unit(s) (e.g., strip) comprises a receiver for receiving information (e.g., digital information). In various embodiments, the receiver comprises an input, such as a wired information input (e.g., a port) (e.g., a USB (e.g., USB 1.0, USB 2.0, USB 3.0) input, a modular connector input (e.g., 4 position 4 contact (4P4C), 6P6C, 6P2C, 6P4C, 6P6C, 8P8C, 10P10C, or similar modular connector)), an Ethernet input, a cat5 input, a cat5e input, a cat6 input, a micro USB input, a mini USB input, a registered jack (e.g., rj11) input, a component input, a RCA input, a coaxial input, a digital visual interface (DVI) input, a video graphics array (VGA) input) a wireless information (e.g., WiFi, 4G, 3G) input, or the like. In certain embodiments, the receiving module is configured to receive compressed information.

Further, display units provided herein generally comprise one or more processor configured to execute one or more program module. In specific embodiments, the processor is a field programmable gate array or suitable microprocessor. In some embodiments, the one or more processor is configured to execute an identification module configured to store and/or access a stored identifier associated with the display strip in which the processor is located. In specific embodiments, the identifier is associated with the location of the display strip. In further embodiments, the one or more processor is configured to execute an identification module configured to determine an identifier associated with the display strip in which the processor is located. In certain embodiments, the one or more processor is configured to execute a content identification module configured to identify local display information to be displayed on the display unit in which the processor is located. In some embodiments, the local display information is a subset of global system display information received by the display unit receiver. In certain embodiments, the one or more processor is configured to decompress global system display information or a subset thereof—such as the identified local display information.

Figure 2:
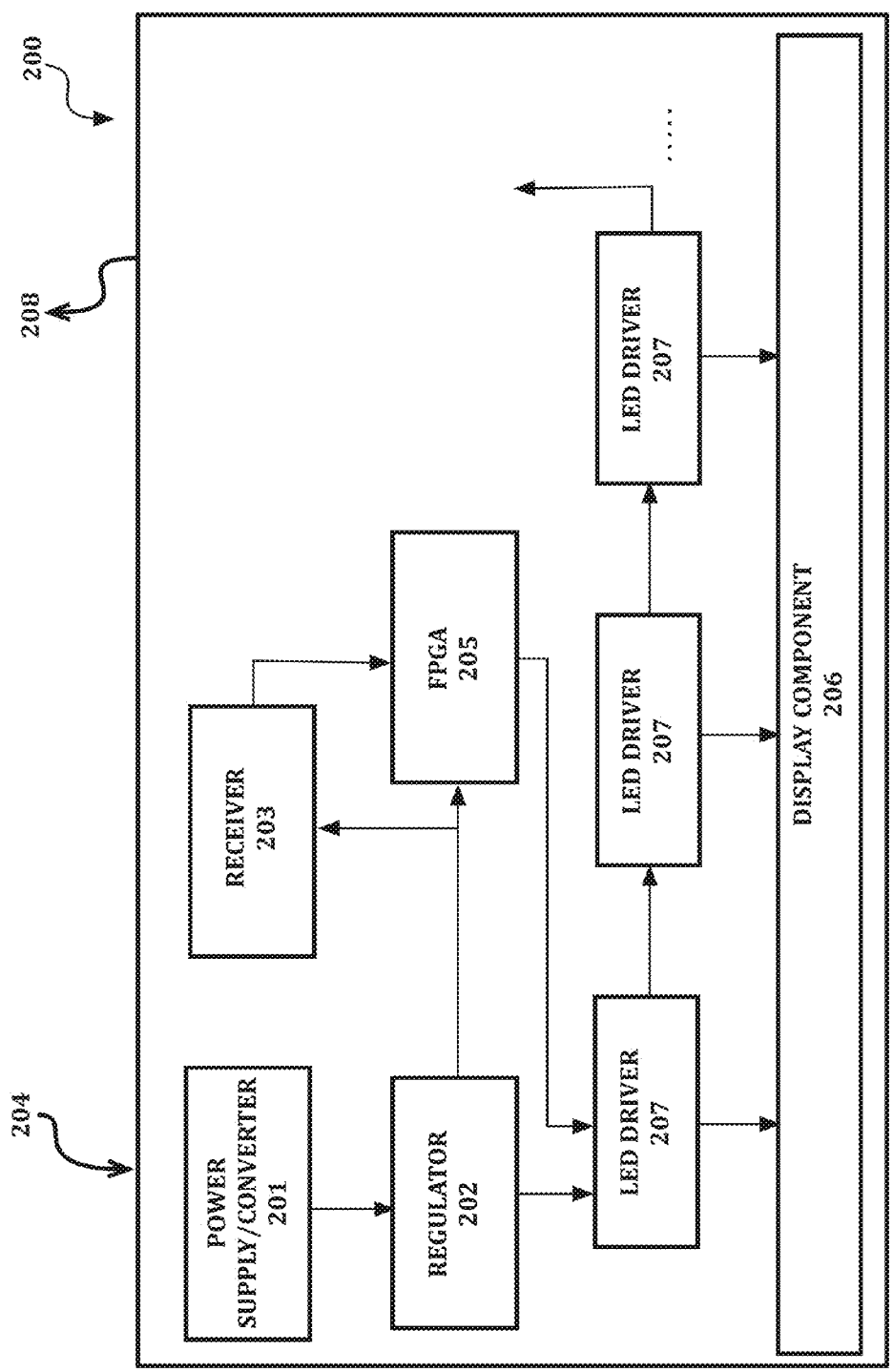
FIG. 2 illustrates various components of an exemplary display unit provided herein.

FIG. 2 illustrates an exemplary display unit 200 provided herein, wherein the display unit is configured to receive power and display information over Ethernet (using Ethernet protocols, or using a cat5, cat5e, cat6 or similar Ethernet type cable using other suitable protocols). The display unit comprises an optional power supply or power converter 201 configured to receive integrated display information and power 204, and an optional power regulator 202 configured to provide a suitable power source to the display unit (e.g., various components thereof). In some embodiments, the power supply or power converter is configured to convert received DC voltage to a suitable DC voltage (e.g., about 3Vdc to about 5Vdc) and the power regulator is configured to regulate the voltage (e.g., at about 3Vdc to about 5Vdc). The exemplary display unit 200 further comprises a display information receiver 203, such as the Ethernet receiver illustrated, and a processor 205, such as the FPGA illustrated. In certain embodiments, the processor 205 is configured to determine the display information to be displayed on the LED array 206. Optional LED drivers 207 are also included. Display information and power are optionally provided to additional display units via any suitable technique, such as daisy chaining 208 (e.g., using a T568B Ethernet cable, or any other suitable cable).

Figure 3:
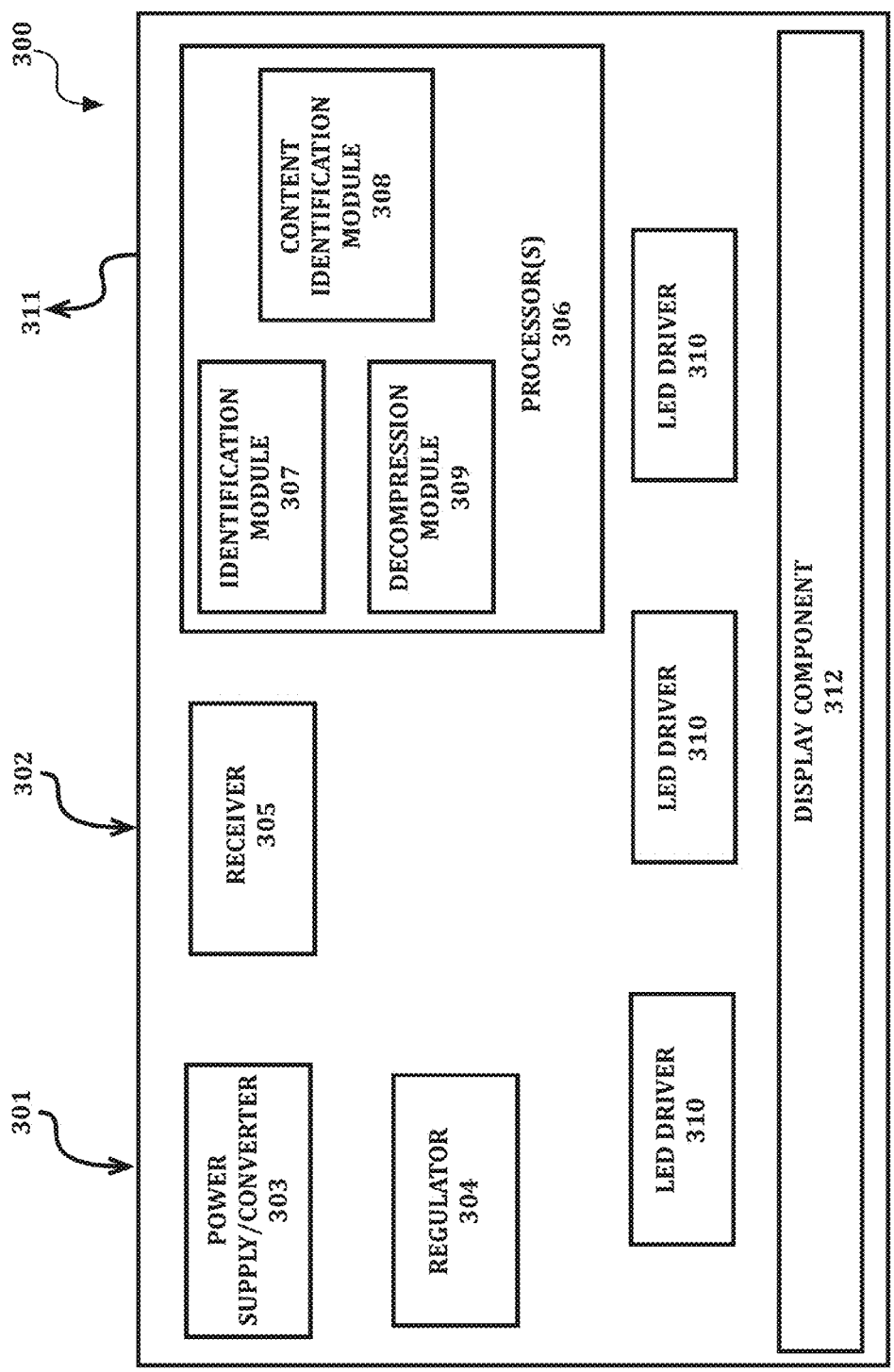
FIG. 3 illustrates various components of an exemplary display unit provided herein.

FIG. 3 illustrates another exemplary display unit 300, wherein the display unit is configured to receive power in a first (power) input 301 (e.g., receive AC power) and display information in a second (information) input 302 (e.g., receiving compressed display information). The display unit comprises an optional power supply 303 (e.g., converting AC power to DC power, such as about 3Vdc to about 5Vdc) connected to the power input 301, and an optional power regulator 304 connected to the power supply 303 and configured to provide a suitable power source to the display unit (e.g., various components thereof). The information input 302 is connected to a receiver (information receiver) 305. The display unit comprises one or more processor (e.g., FPGA) 306 configured to execute one or more program modules configured to identify local display content to be displayed on the display unit (i.e., the LED array thereof 312). In some embodiments, the program modules comprise a display identification module 307, a content identification module 308, and a decompression module 309. Optional LED drivers 310 are also included. Display information and power are optionally provided to additional display units via one or more output 311 using any suitable technique, such as daisy chaining.

Figure 4:
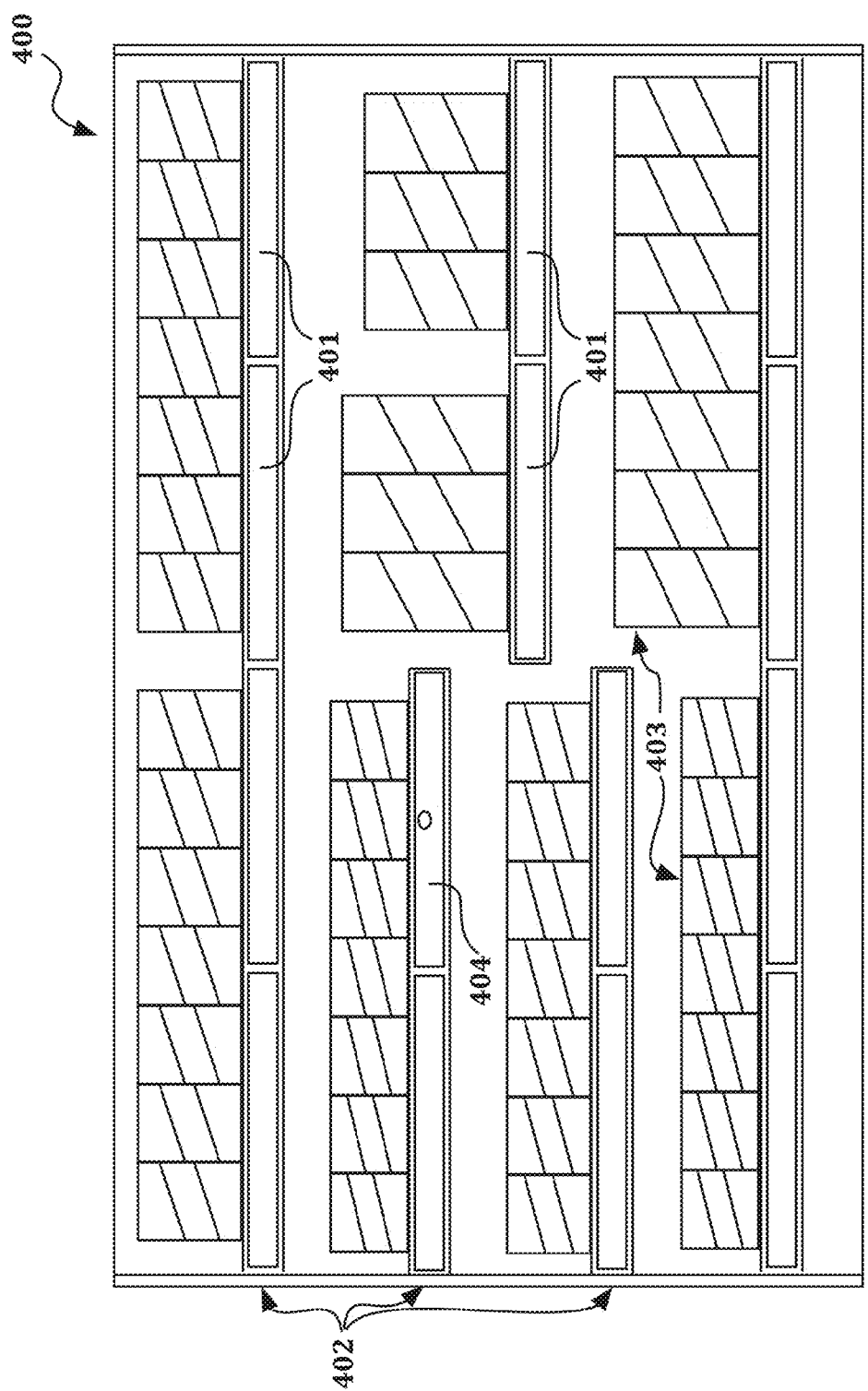
FIG. 4 illustrates an exemplary retail shelving system comprising multiple display units provided herein.

FIG. 4 illustrates a retail system 400 comprising multiple display units 401 provided herein. The display units are optionally affixed to and/or integrated with retail shelving 402. As is illustrated, given the cost effective nature of the displays, it is possible to utilize the display units 401 provided herein to provide specific display content for each product 403 on the shelves, even when the shelves are in complex configurations. In some embodiments, the system comprises one or more display unit comprising a sensor 404 (e.g., camera) configured to detect a sensor state, such as proximity to the sensor or a display unit comprising the sensor, and/or near a display unit comprising the sensor. In some instances, only a single sensor comprising display unit is needed to detect, for example, proximity to several (e.g., nearby) display units. For example, while each or multiple display units of a system optionally comprise a sensor, FIG. 4 illustrates a single display unit comprising a sensor 404. In some embodiments, by reducing the number of display units comprising a sensor, an even more cost effective system is achieved.

Figure 5:
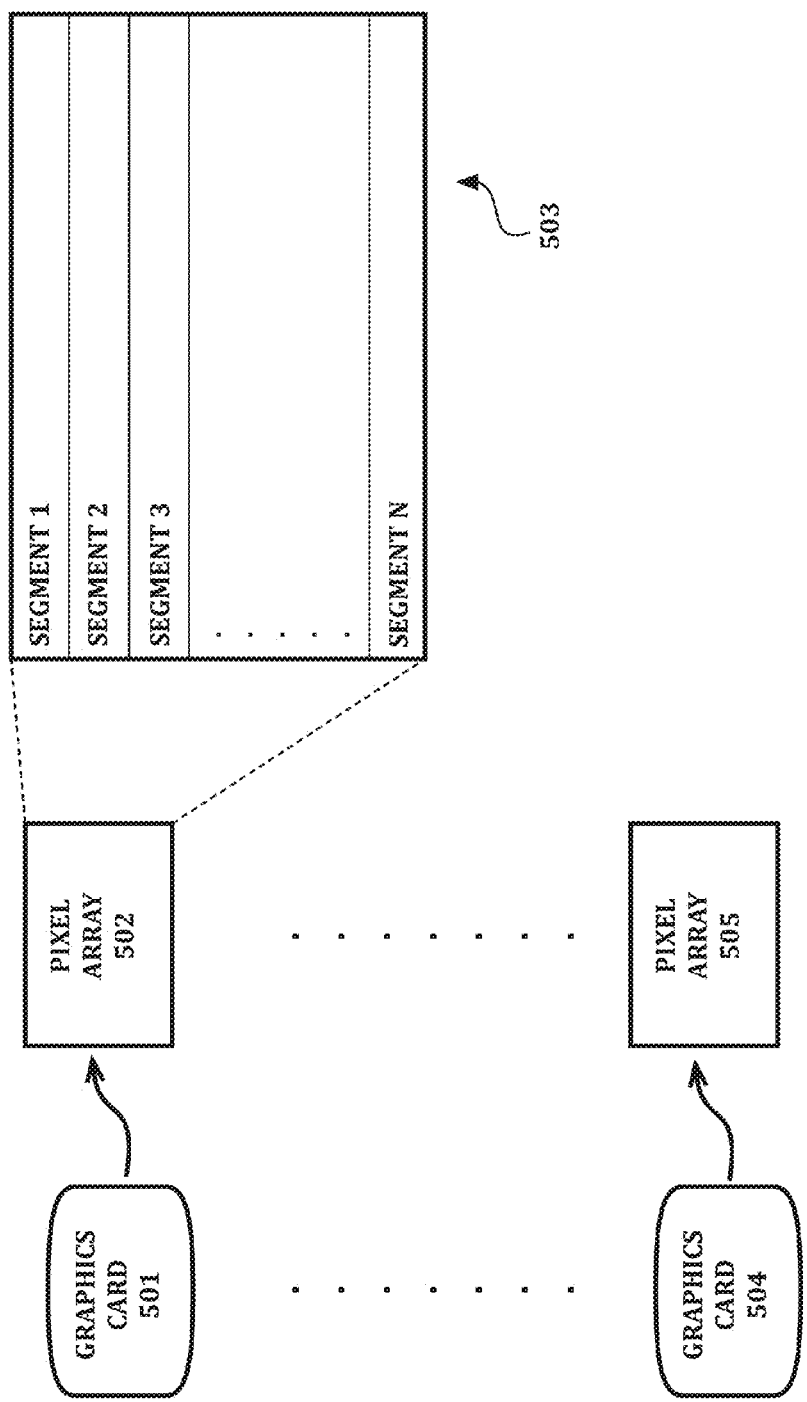
FIG. 5 illustrates an exemplary segmentation schematic of graphic card display configurations into smaller height segments used in the display units and systems provided herein.

FIG. 5 illustrates an exemplary segmentation schematic of graphic or sending card display configurations into smaller height segments used in the display units and systems provided herein. As illustrated, an exemplary graphics (or sending) card 501 (e.g., QWXGA graphics card) provides image content to a pixel array 502 (e.g., 2048×1152). In specific instances, a single QWXGA graphics card of 2048× 1152 supports 2,359,296 pixels in a system provided herein. Optionally, other graphics (or sending) cards are alternatively utilized to prepare other segmentation schemes. Other graphics cards or sending cards supporting various graphics arrays, such as XGA (1024×768), WXGA (1366×768), XGA+(1152×864), WXGA+(1440×900), SXGA (1280× 1024), SXGA+(1400×1050), WSXGA+(1680×1050), UXGA (1600×1200), WUXGA (1920×1200), and many other types are optionally utilized. In specific embodiments, graphics or sending cards provided herein support a system comprising more pixels. For example, in some embodiments, dual sending cards provided herein support twice as many pixels. Further, in some embodiments, the system is configured to provide failover (e.g., by being configured to provide display information to a first and a last display unit of the system), thereby support half as many pixels. Segmentation of such a 2048×1152 array provides, for example, forty eight (48) segments 503 for display units having a height of 24 pixels. In other examples, using such a segmentation scheme is used to provide content to 36 segments for display units having a height of 32 pixels. In some embodiments, systems provided herein are configured as continuous displays (e.g., limited only by the display size desired), e.g., utilizing such techniques. FIG. 6 illustrates the logical layout on a shelf face of such a segmentation configuration (e.g., to create a width of greater than the pixel array width generally supported by a specific graphics card, such as a width greater than 2048 for QWXGA graphics cards). In some embodiments, provided in a system, e.g., a controller thereof, is a segmentation module configured to segment a graphics array to provide display content for a high aspect ratio system display array (e.g., a system display array of greater than that typically supported by the graphics card). In such embodiments, segmentation allows for a single graphics card to provide display content to a very high aspect ratio system display array of 98,304×24 for displays having a height of 24 pixels (e.g., up to over 900 display units having an LED array of 160×24) or 73,728×32 for displays having a height of 32 pixels (e.g., up to over 450 display units having an LED array of 160×32). Further, as illustrated in FIG. 5, with additional (n) graphics cards 504, additional display content is optionally provided to additional (n) arrays 505 that are similarly segmented. As is illustrated in FIG. 7, however, global and local display content is not limited by the segment or display sizes. In some instances, content segments optionally span two or more adjacently configured display units. Depending on how the products are arranged, for example, segmented content (701-708) is optionally stitched together (e.g., by a stitching module discussed herein) in any suitable manner.

Figure 8:
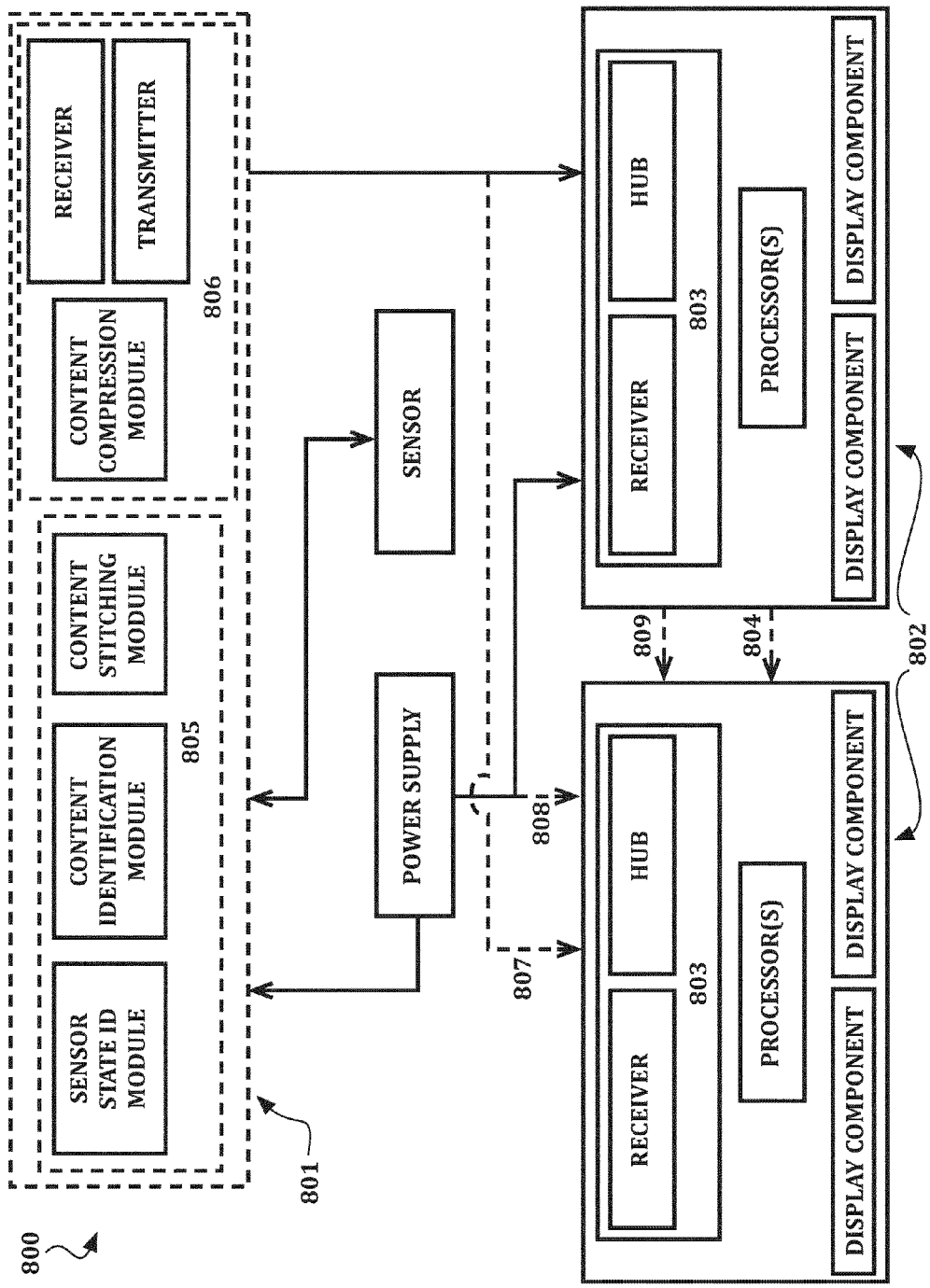
FIG. 8 illustrates components and modules of an exemplary system provided herein.

In some embodiments, provided herein is a display system comprising one or more display unit and a controller. FIG. 8 illustrates an exemplary system 800 comprising a controller 801 and one or more display unit 802. A single controller is illustrated comprising a plurality of components, however, several controller subunits are optionally combined to serve the function of the controller. In some instances, a controller comprises one or more processor 805 configured to execute one or more controller program module. Exemplary program modules comprise, by way of non-limiting example, a sensor state identification modules (e.g., configured to monitor or detect sensor states, particularly operating parameters thereof), content identification module (e.g., configured to identify predetermined information to be provided to the one or more system display units based on the status of the sensor state(s)), a content stitching module (e.g., configured to stitch the predetermined information (e.g., corresponding to local display information to ultimately be displayed at the display unit(s)) together, such as to form a global system display information, a content compression module (e.g., configured to compress display information), and combinations thereof. In some instances, a controller provided herein further comprises a transmitter configured to provide global system display information (e.g., compressed or not), to one or more system display unit 802. In certain embodiments, a system (e.g., controller thereof) provided herein comprises a sending card 806 configured to receive global system display information (e.g., in video format via AVI), a content compression module configured to compress the global system display information, and a transmitter configured to provide the global system display information to a system display unit 802. As illustrated, in some embodiments, a display unit (e.g., display strip) comprises a receiver configured to receive display information (e.g., global system display information or local display information). As further illustrated, in certain embodiments, a display unit (e.g., display strip) comprises one or more output (e.g., an output hub as illustrated) configured to provide display information (e.g., local display information) to one or more display component. In certain embodiments, a display unit provided herein comprises an integrated receiver/hub card, wherein the receiver input and the hub outputs are configured into a single card 803. In some embodiments, integrating the receiver and display output hub allows further compacting of the display unit, which, in some instances, reduces the chances of the display unit being impacted and/or damaged, requiring replacement. In certain embodiments, a display unit provided herein further comprises one or more processor (e.g., FPGA) configured to execute program modules, such as any one or more of the various display unit program modules discussed herein. In certain embodiments, a display unit provided herein comprises an output configured to convey or transmit display information 804 (e.g., global system display information) to another system display unit (e.g., by daisy-chaining). In other embodiments, a controller 801 provided herein optionally provides display information (e.g., global system or local display information) directly 807 to individual display units. In some embodiments, a system provided herein comprises one or more power supply. In certain embodiments, the system comprises at least one power supply (e.g., a switching power supply configured to convert AC to DC, such as about 5Vdc) configured to provide power to one or more display unit and at least one power supply configured to provide power to the controller. In some instances, the system comprises one or more power supply that is configured to provide power directly 808 to one or more display units, configured to provide power directly to a first display unit and chained 809 to a second display unit, or a combination thereof. In certain embodiments, the system 800 further comprises one or more sensor, e.g., configured to provide sensor output signals (e.g., the sensor output signals conveying information regarding a sensor state—i.e., a state of an operating parameter) to a controller 801. In some instances, power is provided to the sensor via a controller power supply (as illustrated) or a display unit power supply. In other instances, a sensor comprises it's own power supply. In certain embodiments, one or more display unit of the system comprises the sensor mounted therein or thereon.

Figure 9:
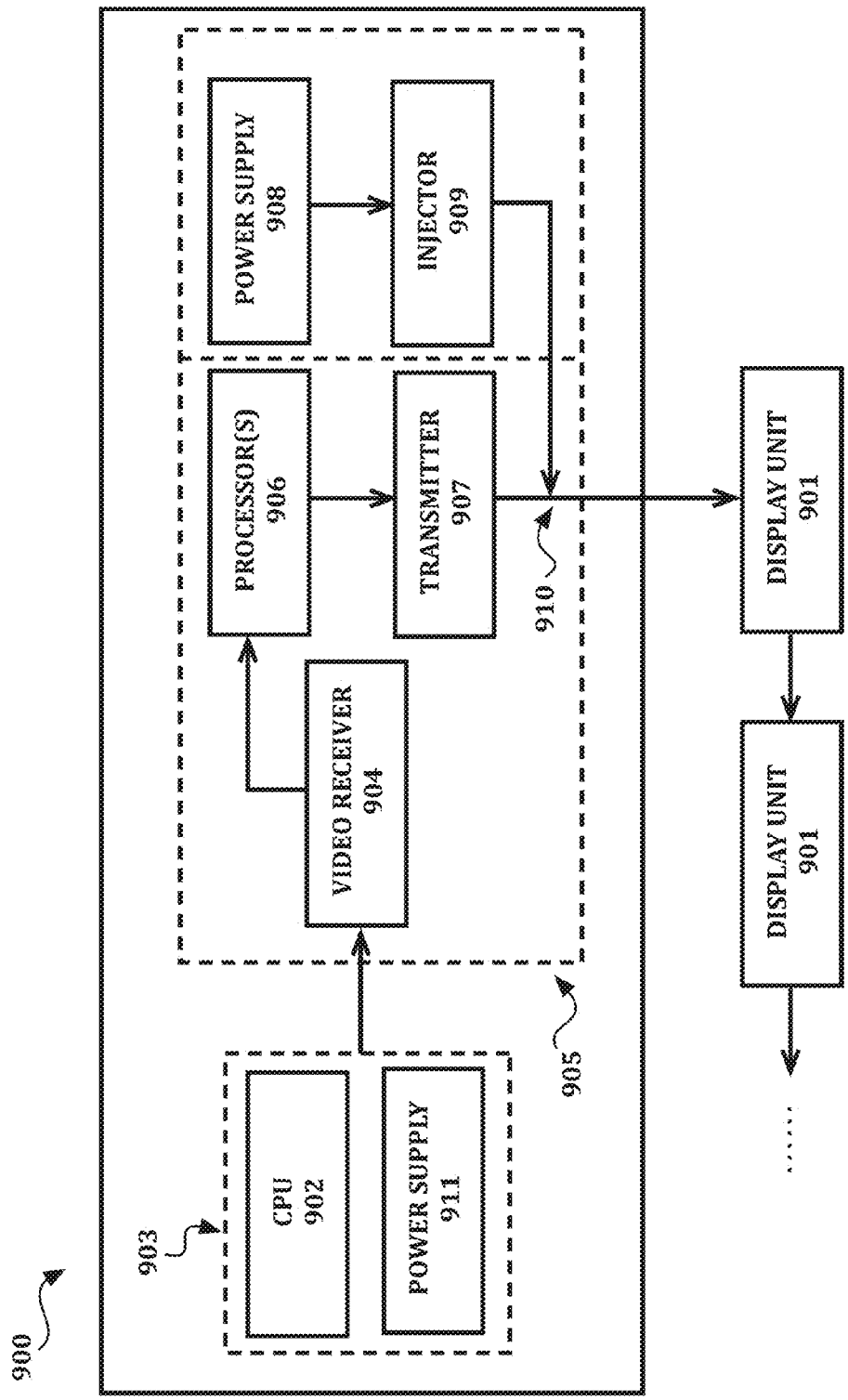
FIG. 9 illustrates components and modules of an exemplary system provided herein.

FIG. 9 illustrates an exemplary controller 900 configured to provide power and display information to one or more display unit 901 provided herein. In some instances, a controller provided herein comprises one ore more processor (e.g., a CPU) 902 and one or more power supply 911 therefor. In some embodiments, a computer 903, such as a personal computer (PC), comprises the one or more processors and power supply therefor. In certain instances, program modules, such as modules configured to detect or monitor operating parameters (such as sensor states) of the system or display units thereof, identify predetermined information to be displayed on the various display units of the system based on the status of the operating parameters, stitch the predetermined information together to generate global system display information, and/or the like, are executed by the one or more processors 902 of the computer 903. In some instances, the computer 903 is configured to transmit or convey a video signal conveying global system display information to a video receiver 904 (e.g., of a sending card 905). In some embodiments, the system (e.g., sending card thereof 905) comprises one or more processor 906 (e.g., FPGA) configured to compress the global system display information (e.g., to allow for transmission of large quantities of content over various cable types, such as Ethernet cables, which also allows integrated transmission of display information and power to the display units). In some instances, the system (e.g., sending card thereof) further comprises a transmitter 907 (e.g., Ethernet transmitter) configured to provide global system display information to one or more system display unit. Further, in some embodiments, such as wherein Ethernet cables (or other cables capable of transmitting information and power, such as USB) are utilized, a power supply 908 and injector 909 are configured to inject power into a cable 910 (e.g., a T568B Ethernet cable, or any other cable suitable for transmitting display information and power) configured to transmit display information to a display unit. In various embodiments, the power supply and injector are optionally included together with, or separate from, a sending card comprising the video receiver, processor(s), and transmitter.

Figure 10:
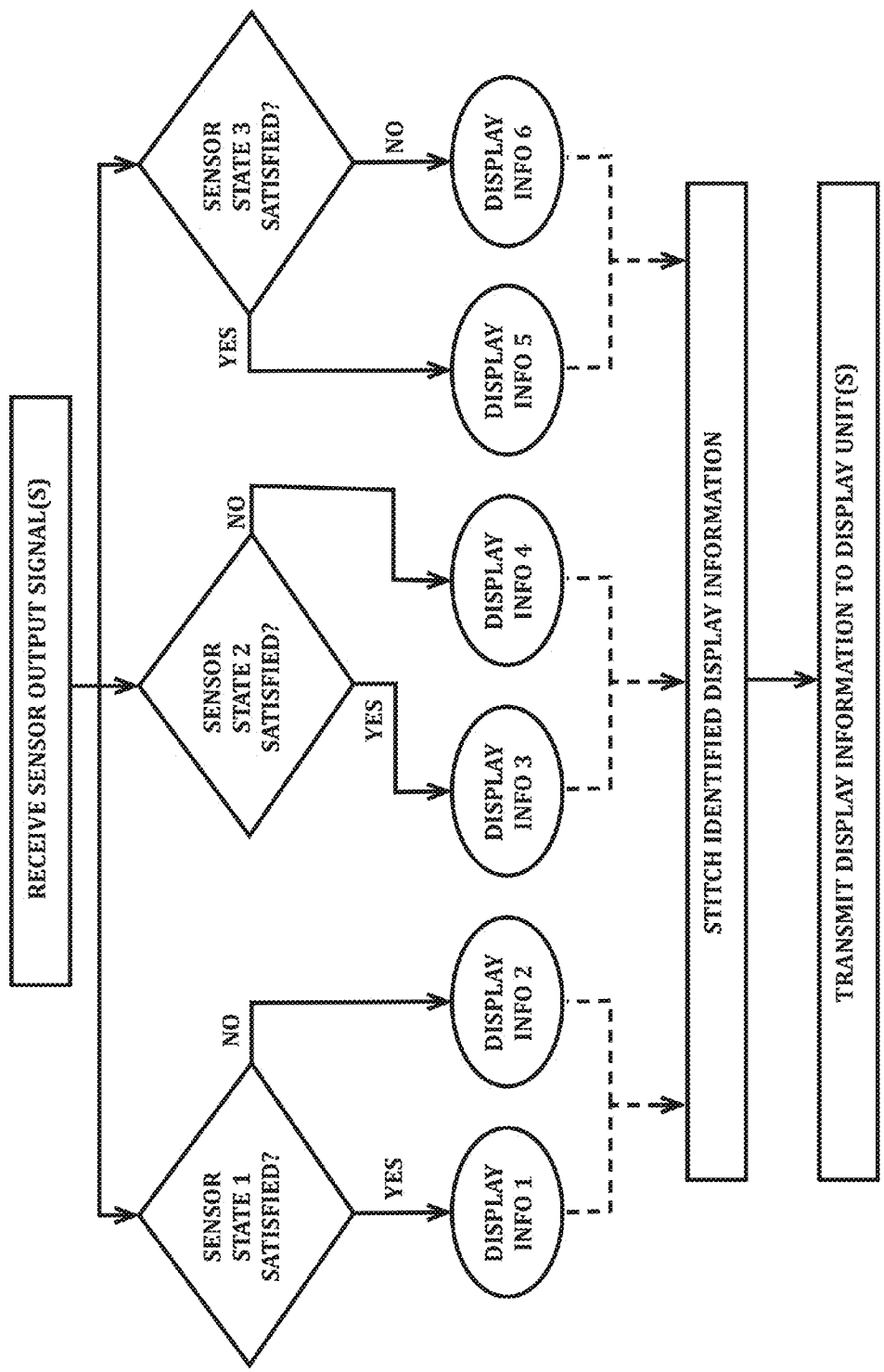
FIG. 10 illustrates modules of an exemplary controller or system provided herein, or steps of an exemplary method provided herein.

FIG. 10 illustrates a schematic of modules described herein configured to receive sensor output signal (e.g., from one or more sensor), identify the status of one or more sensor state (e.g., proximity) associated with one or more display units (e.g., proximity to one or more display units), identify display information corresponding to the identified sensor state(s), and stitch together display information corresponding with the sensor states (e.g., wherein more than one predetermined display information is identified as corresponding to one or more sensor state). In some instances, a single sensor provides output signal that conveys information regarding the sensor state of one or more display unit. For example, in some embodiments, Sensor State 1 corresponds to proximity to a first display unit, Sensor State 2 corresponds to proximity to a second display unit, and Sensor State 3 corresponds to proximity to a third display unit. In certain embodiments, once global system display information has been stitched together, it is transmitted to the one or more display units.

In some embodiments, provided herein is a method for displaying (e.g., interactively displaying) product information in a physical location, such as a retail store (i.e., at a brick-and-mortar merchant). In specific embodiments, the product information is displayed at the front edge of one or more shelf of the location. For example, in some embodiments, it is possible to display such product information in such a manner by affixing or integrating one or more display unit provided herein with one or more shelf at the location. Display units and systems provided herein make it possible to display such information in a cost effective manner. In some embodiments, once one or more display unit, such as an LED display unit provided herein, is mounted at the location (e.g., affixed to or integrated with a shelf of the location), it is possible to display (e.g., interactively display) product information at the location.

In some embodiments, provided herein is a method for dynamically displaying product information in a physical location to a person or customer physically located at the location. In some embodiments, the method comprises providing one or more display unit and one or more sensor at the location (e.g., affixed to and/or integrated with shelving units thereof). In certain embodiments, the method comprises:

i. receiving a sensor output signal from a sensor, the sensor output signal conveying information regarding a sensor state (e.g., location of and/or proximity of a person or customer, such as in relation to the sensor) of the sensor;

ii. determining a sensor state based on the received output signals from the sensor;

iii. identifying predetermined display information associated with the identified sensor state from a display information store (e.g., database); and iv. providing the predetermined display information to the one or more display units.

In certain embodiments, a controller (e.g., comprising one or more controller units), such as described herein, receives the sensor output signal, determines the sensor state, and identifies the display information. In some embodiments, the process further comprises displaying video, images, and/or text associated with the display information on the one or more display units.

In specific embodiments, the sensor output signal further comprises information that identifies the sensor from which the output signal originated. In some instances, this is useful in system comprising multiple display units and multiple sensors. In certain embodiments, the method further comprises determining the identity of the sensor based on the information that identifies the sensor (a sensor identifier) from which the output signal originated. In some embodiments, the process further comprises determining the display unit(s) associated with the sensor (e.g., a display unit or display units in which the sensor is located and/or nearby the sensor or display unit in which the sensor is located). In certain embodiments, the display unit(s) associated with the sensor are determined by accessing a display registry or map, and correlating the sensor identified or sensor identifier with display unit(s) associated with the sensor identified or sensor identifier.

In certain embodiments, a method provided herein comprises identifying predetermined display information associated not only with the identified sensor state, but also with the identified display unit(s), from a display information store (e.g., database). In some embodiments, multiple display units and multiple sensors are present in the system, e.g., being operated by a controller. In certain embodiments, a process or system provided herein comprises receiving or one or more module configured to receive multiple sensor output signals, each sensor output signal convening information regarding one or more sensor state. In some embodiments, a process or system provided herein comprises determining or a module configured to determine multiple sensor states based on the received output signals from the sensors. In some embodiments, a process or system provided herein comprises identifying or a module configured to identify predetermined display information associated with the identified sensor states from a display information store (database). In certain embodiments, a process or system provided herein comprises providing or one or more transmitter or output configured to provide the predetermined display information to the one or more display units.

In specific embodiments, the sensor output signals further comprise information that uniquely identifies the sensors from which the unique output signals originated. In certain embodiments, the method or a system provided herein further comprises determining or a module configured to determine the identity of the sensors based on the information that identifies the sensors (or a sensor identifier) from which the output signal originated. In some embodiments, the method or a system further comprises determining or a module configured to determine the display unit(s) associated with each sensor (e.g., a display unit or display units in which each sensor is located and/or nearby the sensors or display unit in which the sensors are located). In certain embodiments, the display unit(s) associated with the sensors are determined by accessing a display registry or map, and correlating the sensors identified or sensor identifiers with display unit(s) associated with the sensors identified or sensor identifiers.

Figure 11:
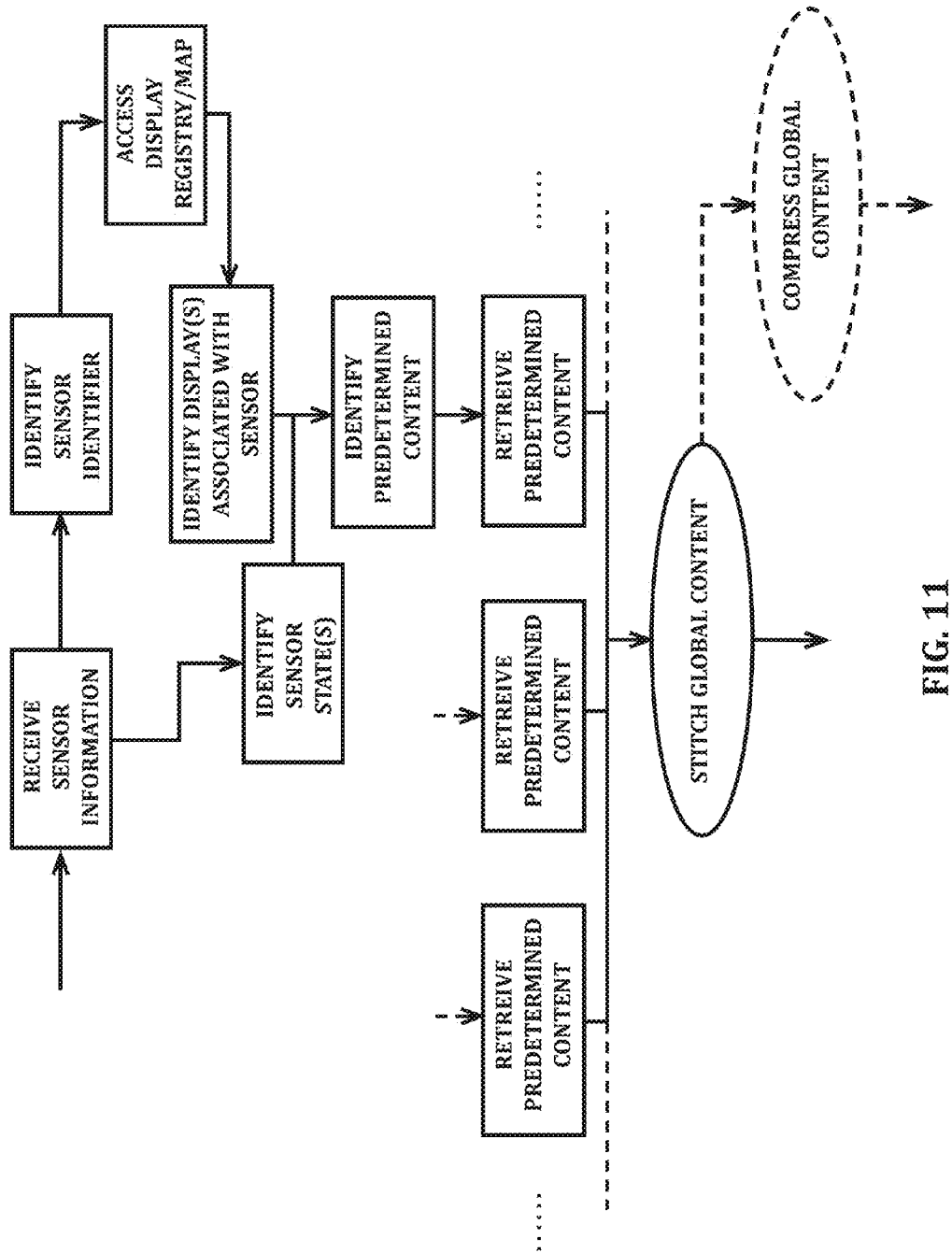
FIG. 11 illustrates modules of an exemplary controller or system provided herein, or steps of an exemplary method provided herein.

As illustrated in FIG. 11, in certain embodiments, predetermined display information is identified and retrieved based on the sensor states identified from multiple sensors. In some instances, once the multiple iterations of predetermined multiple display information is retrieved it is stitched in global system display information and optionally compressed for dissemination to the display units. In certain embodiments, the global system display unit is stitched in a logical order (e.g., as illustrated in FIG. 5 and FIG. 6) to allow for correlation with the correct display information with the correct display units, e.g., based on which display unit(s) are associated with which sensors, as well as how (e.g., order, location, etc.) the display units are associated with the sensors (which can be determined, e.g., by accessing a display unit registry and/or map).

Figure 12:
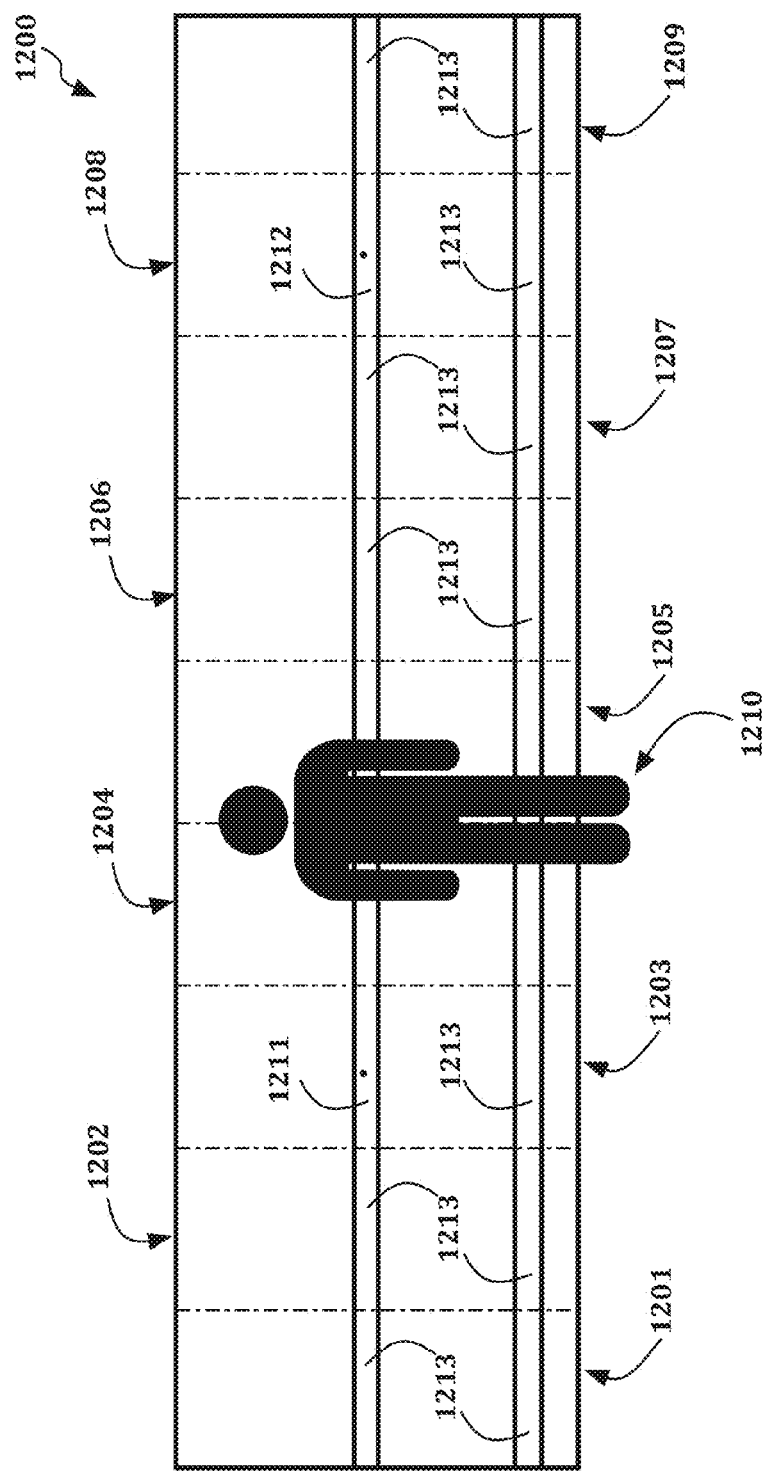
FIG. 12 illustrates an exemplary configuration of single sensors detecting multiple sensor states, e.g., in multiple sensor zones.
Figure 13:
FIG. 13 illustrates an exemplary depiction of a retail store aisle comprising one or more retail display system provided herein.

FIG. 12 illustrates an exemplary retail system 1200 provided herein comprising a first display unit 1211 comprising a first sensor (e.g., camera), a second display unit 1212 comprising a second sensor (e.g., camera), and multiple additional display units 1213. In some instances, the first sensor 1211 is configured to detect multiple sensor states, such as in sensor zones 1201-1205. In some instances, sensor output signals from the sensor in display unit 1211 comprise information regarding sensor states in sensor zones 1201-1205. For example, in the illustration, a person is located in front of the shelving system in sensor zones 1204 and 1205. For example, therefore, the sensor in display unit 1211 is configured to send output signals comprising information about sensor states 1201-1205, and, receiving that information, the controller comprises a module configured (e.g., based on the sensor identity or identifier and the sensor state information) to identify the sensor state of sensor zone 1201 as having no person in sensor zone 1201, identify the sensor state of sensor zone 1202 as having no person in sensor zone 1202, identify the sensor state of sensor zone 1203 as having no person in sensor zone 1203, identify the sensor state of sensor zone 1204 as having a person 1210 in sensor zone 1204, and identify the sensor state of sensor zone 1205 as having a person 1210 in sensor zone 1205. In such examples, the controller is also configured to receive information from a second sensor (in display unit 1212), and one or more module configured to identify the sensor state of sensor zones 1206-1209 as having no person located therein. In some instances, based on such sensor state identification, e.g., using system components and/or modules or processes described herein, specific display information for the various display units in the various sensor zones of the system is identified, retrieved, and stitched into global system display information that is provided to the system display units (e.g., wherein the display units are configured to identify the subset of global display information that is local thereto, and display such local display information). FIG. 13 illustrates an exemplary depiction of a retail store aisle comprising one or more retail display system provided herein.

Figure 15:
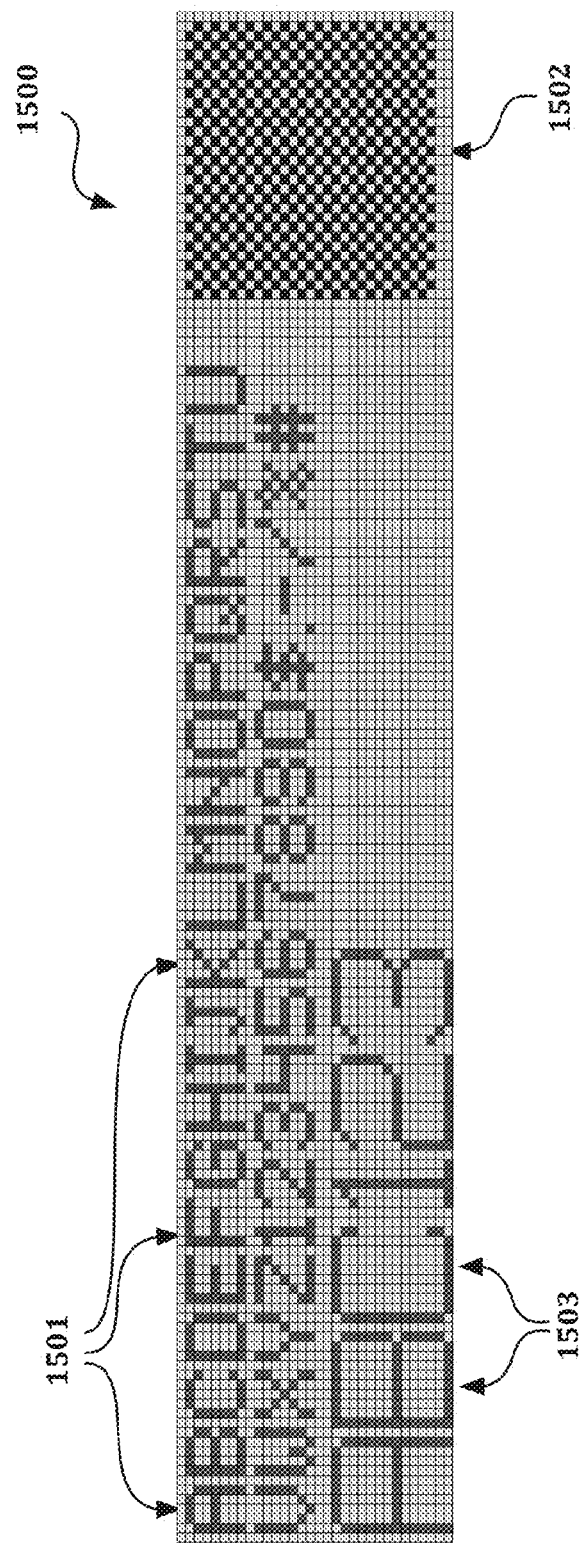
FIG. 15 illustrates an exemplary LED array of a display unit provided herein, with exemplary text configurations for display thereon.

In certain embodiments, display information provided to the display units and systems described herein is any suitable display information, including, by way of non-limiting example, video, images, text, and combinations thereof. As discussed herein, in preferred embodiments, display units provided herein comprise an array of LED pixels, the array having a height of 30 pixels or more. As illustrated in FIG. 15, such array sizing allows for up to at least 4 lines of aesthetically pleasing text, with spacing between the text. In addition, good quality resolution images (such as product logos, QR codes, and the like) and video can also be displayed. In certain embodiments, display units and systems thereof (or processors thereof) are configured to display text fonts having a height of (at least) 7 pixels and a width of up to (at least) 5 pixels 1501. In some embodiments, larger fonts are optionally utilized, such as those having a height of 14 pixels and a width of up to 10 pixels 1503. In some embodiments, QR Codes have a height and width of up to 29 pixels 1502. In certain embodiments, a display unit provided herein provides a single content segment (or tag) that extends along the entire width of the unit (e.g., 160 pixel wide segment 1500 of the unit illustrated in FIG. 15). In other embodiments, a display unit herein is optionally divided into multiple content segments, such as half the display unit (e.g., an 80 pixel wide segment), a quarter (e.g., a 40 pixel wide segment), or any suitable fraction of the display unit.

In various embodiments, display units and systems described herein are configured to alter display content (e.g., alter display information provided to the display units) based on a sensor state of the display unit or system. In some instances, as discussed herein, such sensor states include identifying "motion" or "no motion." In further embodiments, sensor states include (and/or a sensor, e.g., camera, provided herein is configured to be able to detect), by way of non-limiting embodiment, "motion," "no motion," and "captive" (e.g., as determined by identifying a face—i.e., facial recognition). Other exemplary sensor states include, by way of non-limiting example, "in proximity" or "not in proximity." Generally, based on such determinations, systems provided herein comprise program modules configured to identify and provide specific display information (content) to the display unit(s) thereof. For example, in some instances, when a sensor state is identified as "no motion" for one or more display unit, the system is configured to provide specific (and predetermined) display information, such as logos or decals of the products located at (e.g., on a shelf at, above, or below) the display units identified as having a sensor state of "no motion," but when the sensor state is identified as "motion" for the one or more display unit, the system is configured to provide different, specific (and predetermined) display information, such as text describing the product(s), the price of the product(s), and optionally a QR code for the product(s) located at (e.g., on a shelf at, above, or below) the display unit(s) identified as having a sensor state of "motion."

What is claimed is:

1. A retail display system comprising:
   a housing;
   a controller,
   a first high aspect ratio display strip disposed within the housing, the first high aspect ratio display strip including:
   a first display including a first array of viewable pixels;
   a first input configured to receive global system display information;
   a first output configured to provide first local display information to the first high aspect ratio display, the first local display information of the first high aspect ratio display strip being a subset of the global system display information and relating to a first product located proximate the first high aspect ratio display strip;
   a second output configured to transmit the global system display information;
   one or more first processors configured to execute first display strip program modules, the first display strip program modules including a content identification module configured to identify the first local display information of the first high aspect ratio display strip;
   a first sensor configured to provide a first sensor output signal to the controller, the first sensor being disposed within the housing and configured to detect or identify motion, an object, or a person in proximity to the first high aspect ratio display strip and the first sensor output signal conveying information regarding a state of an operating parameter;

a second high aspect ratio display strip disposed within the housing, the second high aspect ratio display strip comprising:
  a second high aspect ratio display including an array of viewable pixels;
  a second input daisy-chained to the second output of the first high aspect ratio display strip wherein the second input is configured to receive the global system display information from the second output of the first high aspect ratio display strip;
  a third output configured to provide second local display information to the second high aspect ratio display, the second local display information of the second high aspect ratio display strip being a subset of the global system display information and relating to a second product located proximate the second high aspect ratio display strip;
  one or more second processors configured to execute second display strip program modules, the second display strip program modules including a second content identification module configured to identify the second local display information of the second high aspect ratio display strip;

wherein the controller is configured to:
  determine an association between the sensor and at least the first high aspect ratio display strip by performing a correlation using the first sensor output signal wherein the first high aspect ratio display strip is included among a plurality of high aspect ratio display strips receiving information from the controller;
  generate, based upon the correlation, the global system display information using the first local display information and the second local display information; and
  transmit the global system display information to the first high aspect ratio display strip.

2. The system of claim 1, wherein the first display strip program modules further comprise a first identification module configured to determine a stored first identifier associated with the first high aspect ratio display strip, and the second display strip program modules further comprise a second identification module configured to determine a stored second identifier associated with the second high aspect ratio display strip.

3. The system of claim 1, wherein the controller is further configured to compress the global system display information.

4. The system of claim 3, wherein the first display strip program modules further comprise a first decompression module configured to decompress the first local display information, and the second display strip program modules further comprise a second decompression module configured to decompress the second local display information.

5. The system of claim 1, wherein the controller is further configured to retrieve the first and second local display information.

6. The system of claim 5, wherein further the first local display information spans the first high aspect ratio display and a third high aspect ratio display adjacent the first high aspect ratio display and the second local display information spans the second high aspect ratio display and a fourth high aspect ratio display adjacent the second high aspect ratio display.

7. The system of claim 1 further including a housing configured to receive the first high aspect ratio display and the second high aspect ratio display.

8. The system of claim 1, wherein the first sensor output signal is indicative of whether or not a person is present.

9. The system of claim 1, wherein the first sensor is a camera or a motion detector.

10. The system of claim 1, wherein the first and second array of viewable pixels include LED pixels and have a pixel pitch of about 2.5 mm or less.

11. The system of claim 1, wherein the first and second array of viewable pixels include LED pixels and have a height of about 30 pixels or more.

12. The system of claim 1, wherein the global system and local display information comprise at least one of video, images, and text.

13. The system of claim 1, wherein the second high aspect ratio display strip is configured to provide the global system display information to an additional high aspect ratio display strip.

14. The system of claim 1 a second sensor configured to provide a second sensor output signal to the controller, the second sensor being associated with the second high aspect ratio display strip, the controller being further configured to determine a correlation between the second sensor output signal and the second high aspect ratio display strip.

15. The system of claim 1, wherein the controller is further configured to determine an association between the sensor and the second high aspect ratio display strip by performing the correlation using the first sensor output signal.

16. A high aspect ratio retail display unit comprising:
  a housing;
  a receiving card comprising a first circuit board, the first circuit board comprising a first input, a first output, and second output mounted thereon, the first input configured to receive or to be connected to receive first display information;
  a first high aspect ratio display disposed within the housing and comprising a second circuit board comprising a first and a second surface, a first array of first pixels mounted on or in the first surface, and a second input mounted on the second surface, the first output configured to convey second display information to the second input wherein the second display information relates to a first product located proximate the first array of pixels;
  a second high aspect ratio display disposed within the housing and comprising a third circuit board comprising a third and a fourth surface, a second array of second pixels mounted on or in the third surface, and a third input mounted on the fourth surface, the second output configured to convey third display information to the third input; and
  a sensor disposed within the housing and configured to detect or identify motion, an object, or a person in proximity to the display unit, the sensor comprising an output configured to convey or to be connected to convey a sensor output signal wherein at least a portion of the second display information is provided to the first array of pixels in response to the sensor output signal upon determining that the high aspect ratio retail display unit is associated with the sensor wherein the high aspect ratio retail display unit is included among a plurality of high aspect ratio retail display units receiving information from a system controller;

wherein the housing is defined with an opening, and wherein the receiving card, the first high aspect ratio display, the second high aspect ratio display, and the sensor are received in the housing, and the first and the third surfaces are exposed by the opening.

17. The display unit of claim 16, further comprising a third output configured to be connected to and convey first display information to an additional display, the first array of first pixels having a pixel pitch of about 2.5 mm or less; the second array of second pixels having a pixel pitch of about 2.5 mm or less; and the display unit having an aspect ratio (length/height) of about 2 or more.

18. The display unit of claim 16, wherein the first pixels comprising a red LED chip, a green LED chip, and/or a blue LED chip; and the second pixels comprising a red LED chip, a green LED chip, and/or a blue LED chip.

19. The display unit of claim 16, wherein the first pixel array has a height of about 30 pixels or more; the second pixel array has a height of 30 pixels or more; the height of the display unit is about 50 mm to about 100 mm; and the depth of the display unit is about 25 mm or less.

20. A method for dynamically displaying product information in a physical location to a person physically located at the location, the method comprising:
 a. providing a first display unit and a first sensor disposed within a housing at the location;
 b. receiving a first sensor output signal from the first sensor, the first sensor output signal conveying information regarding a first sensor state of the first sensor;
 c. determining the first sensor state based on the first sensor output signal;
 d. correlating the first sensor output signal to the first display unit in order to determine that at least the first display unit is associated with the first sensor;
 d. retrieving first predetermined display information for display on the first display unit, the first predetermined display information being associated with the first sensor state;
 e. providing a second display unit and a second sensor at the location wherein the first display unit and the second display unit are included among a plurality of display units;
 f. receiving a second sensor output signal from the second sensor, the second sensor output signal conveying information regarding a second sensor state of the second sensor;
 g. determining the second sensor state based on the second output signal;
 i. correlating the second sensor output signal to the second display unit in order to determine that at least the second display unit and a third display unit are associated with the second sensor;
 h. retrieving second predetermined display information for display on the second display unit, the second predetermined display information being associated with the second sensor state;
 i. generating global system display information using the first predetermined display information and the second predetermined display information;
 j. displaying the global system display information.

21. The method of claim 20, further comprising providing the global system display information to the first display unit wherein the first display unit is configured to send at least a portion of the global system display information including the second predetermined display information to the second display unit.

22. The method of claim 20 wherein the first sensor output signal includes a first sensor identifier, the correlating the first sensor output signal including mapping the first sensor identifier to the first display unit.

* * * * *